United States Patent
Dietzen et al.

(10) Patent No.: US 11,378,235 B2
(45) Date of Patent: Jul. 5, 2022

(54) METHOD AND APPARATUS FOR DETECTING LEAKS IN A BUILDING WATER SYSTEM

(71) Applicant: ENCO ELECTRONIC SYSTEMS, LLC, Destin, FL (US)

(72) Inventors: Gary H. Dietzen, Destin, FL (US); Ronald R. Murphy, Dothan, AL (US); Terry L. Beasley, Dothan, AL (US); Daniel L. Dietzen, Miramar Beach, FL (US)

(73) Assignee: ENCO ELECTRONIC SYSTEMS, LLC, Destin, FL (US)

(*) Notice: Subject to any disclaimer, the term of this patent is extended or adjusted under 35 U.S.C. 154(b) by 62 days.

(21) Appl. No.: 16/509,867

(22) Filed: Jul. 12, 2019

(65) Prior Publication Data

US 2020/0072421 A1  Mar. 5, 2020

Related U.S. Application Data

(63) Continuation of application No. 15/221,475, filed on Jul. 27, 2016, now Pat. No. 10,352,504.
(Continued)

(51) Int. Cl.
*F17D 5/06* (2006.01)
*G08B 21/20* (2006.01)
(Continued)

(52) U.S. Cl.
CPC .......... *F17D 5/06* (2013.01); *G01M 3/26* (2013.01); *G01M 3/2807* (2013.01); *G08B 5/223* (2013.01); *G08B 21/20* (2013.01)

(58) Field of Classification Search
None
See application file for complete search history.

(56) References Cited

U.S. PATENT DOCUMENTS 4,253,341 A  3/1981 Ikeda et al.
4,348,730 A  9/1982 Emerson et al.
(Continued)

FOREIGN PATENT DOCUMENTS

CN  202734891  2/2013
FR  2922015  4/2009
(Continued)

*Primary Examiner* — Daniel S Larkin
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

A system and method for detecting multiple incidents in a set of flow meter units attached to a set of water consuming units. A plurality of uniquely identified flow meter units are operatively connected to a central control unit. The control unit is programmable to send alerts based on leaking incident status of particular flow meter units so that a responder may receive the alert and timely address the alert. The central control receives and stores data from the multiple flow meter units, including volumetric flow, time, and status and location of each alert. A method of detecting leaking in a building having multiple separate units, each unit having a unit water supply, includes placing a specially configured controller having a flow meter and automatic shut-off valve in each unit of the building. Leak sensors are positioned in water-leak risk areas wherein the controller communicates with both the flow meter and the sensors. A communication is established in between the controller and the sensors. One or more individuals are identified to receive an alert when leakage (or over-pressure conditions) occurs. Water flow is measured with the controller in multiple of the units and using one or more of the sensors. The measurements detect changes when compared to earlier established baseline parameters. An alert is sent to one or more of the individuals (e.g. owner(s), maintenance staff, management) when an abnormal water flow valve is measured.

10 Claims, 15 Drawing Sheets

Related U.S. Application Data

(60) Provisional application No. 62/198,508, filed on Jul. 29, 2015.

(51) Int. Cl.
    *G08B 5/22*     (2006.01)
    *G01M 3/28*     (2006.01)
    *G01M 3/26*     (2006.01)

(56) References Cited

U.S. PATENT DOCUMENTS

| | | |
|---|---|---|
| 4,629,404 A | 12/1986 | Raymond |
| 4,705,060 A | 11/1987 | Goulbourne |
| 4,804,957 A | 2/1989 | Selph et al. |
| 4,938,053 A | 7/1990 | Jepson et al. |
| 5,252,967 A | 10/1993 | Brennan et al. |
| 5,434,911 A | 7/1995 | Gray et al. |
| 5,775,372 A | 7/1998 | Houhlihan |
| 5,829,470 A | 11/1998 | Yowell et al. |
| 5,946,641 A | 8/1999 | Morys |
| 6,191,687 B1 | 2/2001 | Dlugos et al. |
| 6,216,727 B1 | 4/2001 | Genova et al. |
| 6,374,846 B1 * | 4/2002 | DeSmet ............... E03B 7/071 137/15.01 |
| 6,612,188 B2 | 9/2003 | Hamilton |
| 6,653,945 B2 | 11/2003 | Johnson et al. |
| 6,710,721 B1 | 3/2004 | Holowick |
| 6,755,148 B2 | 6/2004 | Holowick |
| 6,778,099 B1 | 8/2004 | Meyer et al. |
| 6,798,352 B2 | 9/2004 | Holowick |
| 6,952,970 B1 | 10/2005 | Furmidge et al. |
| 6,962,162 B2 | 11/2005 | Acker |
| 7,504,964 B2 | 3/2009 | Brennan et al. |
| 7,671,480 B2 * | 3/2010 | Pitchford ............... G01F 15/063 290/43 |
| 8,489,342 B2 | 7/2013 | Dugger et al. |
| 8,757,009 B2 | 6/2014 | Jennings |
| 8,939,016 B2 | 1/2015 | Brasel et al. |
| 10,352,504 B2 | 7/2019 | Dietzen et al. |
| 2004/0113812 A1 | 6/2004 | Bianchi et al. |
| 2005/0006402 A1 | 1/2005 | Acker |
| 2012/0144898 A1 * | 6/2012 | Brasel .................... G01F 15/14 73/40.5 R |
| 2013/0207815 A1 | 8/2013 | Pitchford et al. |
| 2014/0303909 A1 | 10/2014 | Hanks et al. |

FOREIGN PATENT DOCUMENTS

| | | |
|---|---|---|
| FR | 2980281 | 3/2013 |
| KR | 100973662 | 8/2010 |
| WO | 2007024894 | 3/2007 |

* cited by examiner

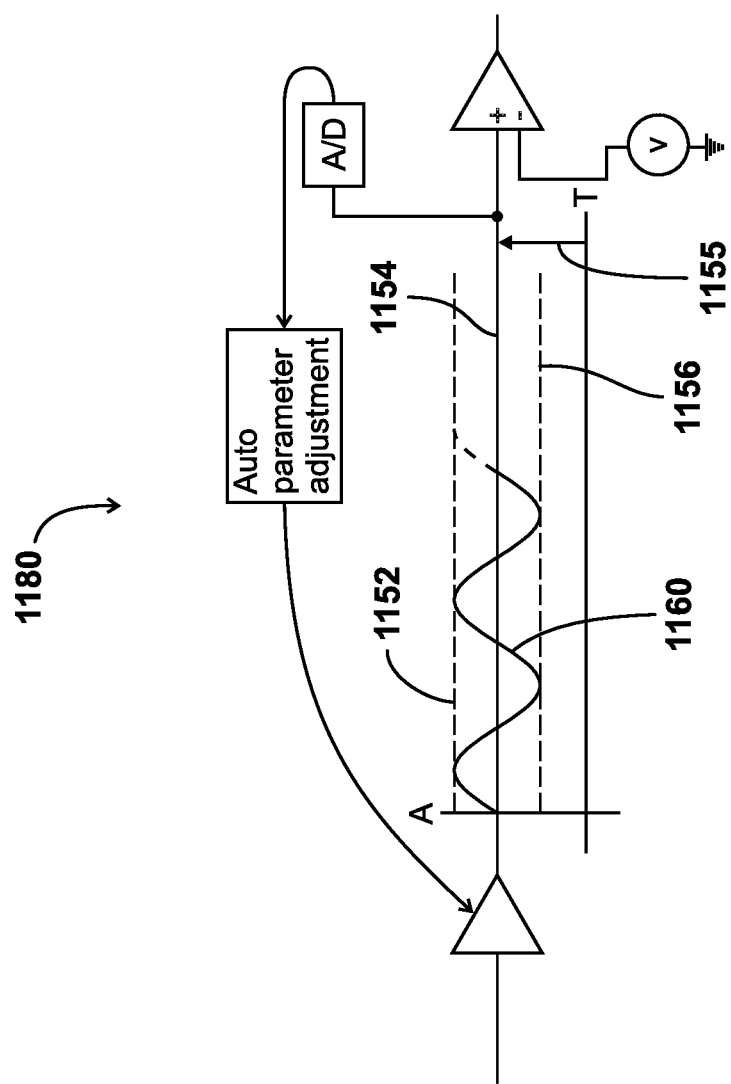

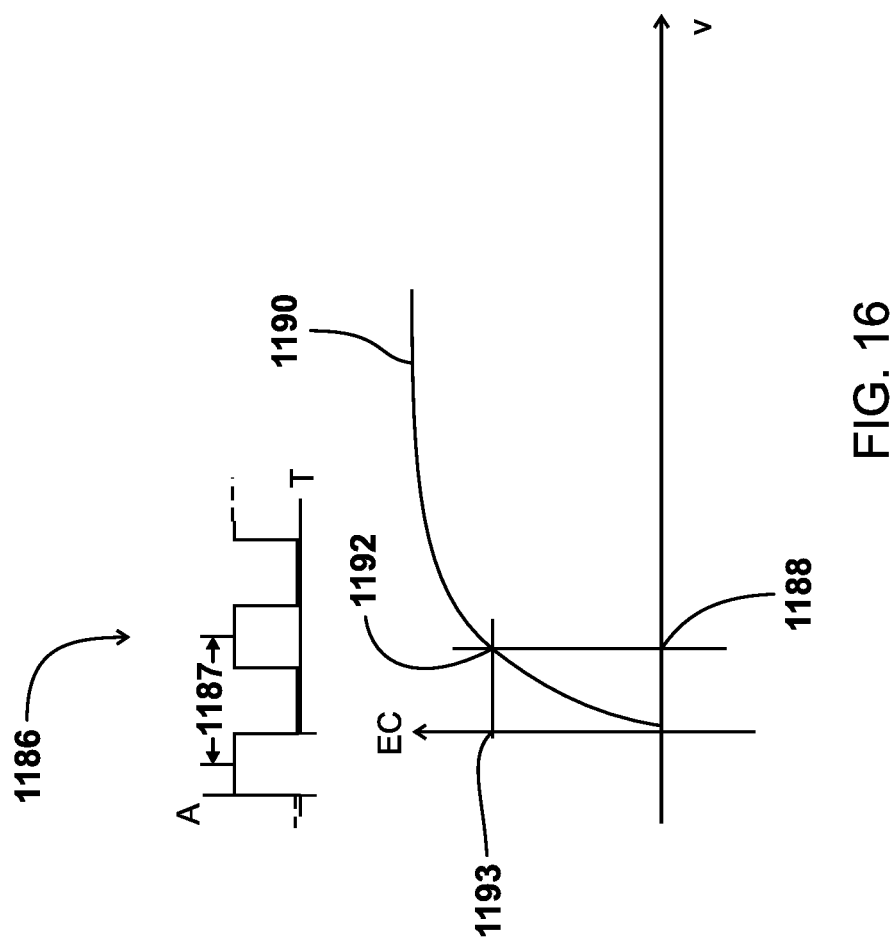

METHOD AND APPARATUS FOR DETECTING LEAKS IN A BUILDING WATER SYSTEM

CROSS-REFERENCE TO RELATED APPLICATIONS

This application is a continuation of U.S. patent application Ser. No. 15/221,475, filed 27 Jul. 2016 (issued as U.S. Pat. No. 10,352,504 on 16 Jul. 2019), which claims the benefit of U.S. Provisional Patent Application Ser. No. 62/198,508, filed 29 Jul. 2015 incorporated herein by reference and priority of which is hereby claimed.

STATEMENT REGARDING FEDERALLY SPONSORED RESEARCH OR DEVELOPMENT

Not applicable

BACKGROUND

Buildings such as high rise condominiums require careful control of leakage of the building fresh water supply system. In such buildings, even small leaks can grow into large problems because the unit may be unoccupied for long periods of time while the small leak is occurring, such as where the occupant of the leaking unit may be away on vacation for weeks or months at a time. A case of such water leakage if undetected can thus damage the structure of the building.

There are a variety of leak detection systems with an automatic water shut off. Two sellers of leak protection equipment can be seen at http://www.flologic.com and http://www.watercop.com. Most of the systems available consist of a plurality of leak sensors located at various leak points in a unit with the sensors communicating wirelessly using z-wave, zigbee, or other RF communication methods to communicate with an automatic shut-off valve for the unit which shutoff valve cuts off the water supply to the unit when notified by one of the sensors warns of a suspected water leak. In these prior art systems, sensors are placed under various leak points such as sinks, washing machines, refrigerators, water rinsing appliances, and other water-leaking risk areas.

Some water leak protection systems use only a flow meter to detect extended continual flow, i.e. systems. The FLO-LOGIC® system can detect flow but does not record or analyze the type or quantity of flows and does not detect very small flows. If continual flow over a set time period occurs, then these prior art leak detection cause water flow to be shut off. Although most systems are stand-alone and do not offer notification options, there are some systems that can be set up to send a notification signal to a smart phone or email address, but these are one-way communications. Typically there is no monitoring of the system to ensure that it is working. Most available systems are designed for individual residences and are not part of a building-wide protection system.

In various embodiments are provided a method and apparatus for detecting water leakage in one or more units of a building complex having multiple units (each units with its own water supply) along with identifying the particular unit(s) of the building complex having the leak which method and apparatus, in identifying a leaking event, applies algorithms comparing changes in flow rates compared to one or more selected base line flow rate for the unit(s) and/or building complex.

When a leak incident occurs but is not timely addressed, the water consuming unit having the leak incident can suffer large amounts of water damage.

There is a need to efficiently, timely, and properly manage multiple numbers of flow meter units and possible leak incidences from said units. There is also a need for extended monitoring (e.g., on a 24 hour basis, seven days a week) for one or more water consuming units with possible multiple numbers of leak incidents simultaneously occurring (or occurring within short periods of time).

A flow meter unit has been developed which is operably connectable to a water consumption unit and in various embodiments operably connectable to a central control unit which can monitor the flow meter unit. In various embodiments the method and apparatus can include:

a flow meter unit that monitors usage of a water consuming unit or a water consuming network, a control unit (local and/or central) that is operatively connected to the flow meter unit and both:

(a) controls the flow meter unit; and (b) interprets flow measurements recorded by the flow meter unit.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

In various embodiments is provided a method and apparatus solving the problems confronted in the art in a simple and straightforward manner.

In various embodiments is provided a building or condominium wide interconnected system designed to detect water leaks using commercially available water sensors placed in water risk areas.

In various embodiments is provided a custom designed flow meter/controller incorporating a highly sensitive flow meter which can measure flow volumes accurately in very low to extremely low flow volumes and/or rates.

In various embodiments, the method and apparatus can have each building complex or condominium unit outfitted with a combination flow meter/local controller/automatic shut-off valve.

In various embodiments the local controller of the flow meter unit preferably communicates with leak sensors located interior to the units and positioned in water-leak risk areas.

In various embodiments are provided a method and apparatus for monitoring water flow and/or leaking conditions for a plurality of water consuming units.

In various embodiments the plurality of water consuming units can be a plurality of condominium units.

In various embodiments the plurality of water consuming units can form a water consuming network.

In various embodiments multiple flow meter units can be equipped with leak detection equipment and/or programming that may be used in commercial or noncommercial environments.

In various embodiments the multiple flow meter units can be supplemented by one or more leak detection sections located at one or more possible leak sources in the plurality of water consuming units.

In various embodiments each of the multiple flow meter units can include unique identifiers allowing the method and apparatus to individually identify communications from each of the particular flow meter units in a plurality of flow meter units attached to a plurality of water consuming units.

In various embodiments of the method and apparatus, each flow meter unit includes a local controller operatively connected to and communicating with a flow meter, along with being operatively connected to (e.g., wirelessly or hard wired) to a plurality of leak sensors in a water consumption unit. In various embodiment the wireless connectivity can be established and maintained via z-wave, zigbee, or other RF communication technologies and/or protocols.

In various embodiments of the method and apparatus, each local controller is also operatively connected to and communicating with a central controller. In various embodiment the wireless connectivity can be established and maintained via z-wave, zigbee, or other RF communication technologies and/or protocols. In various embodiments each local controller can information and/or data from its flow meter unit based on the water consumption of the unit that said flow meter unit is connected to, to the central controller.

In various embodiments the central controller includes an operatively connected display/input panel.

In various embodiments, the method and apparatus can:
(a) issue one or more warning signals if a leaking condition is identified; and/or
(b) collect multiple levels of data regarding one or more leaking conditions; and/or
(c) provide warning notification(s) to one or more identified persons (e.g., unit owners); and/or In various embodiments, the following steps can be included:
(a) a plurality of flow meter units are operatively connected to a plurality of water consuming units with each flow meter unit having a unique identifier; and
(b) the plurality of flow meter units being operatively connected to a central control; and
(c) the plurality of flow meter units being monitored by the central control for one or more leak incidents; and
(d) the central control issuing a warning after the identification of a leak incident using one of the flow meter units.

In various embodiments the method and apparatus include a unique monitoring method and/or program wherein a central controller is operatively connected to each of a plurality of flow meter units and communicates with all local controllers of the plurality of flow meter units at one or more building complexes each having a plurality of water consumption units.

In various embodiments the method and apparatus can receive alerts, warning, and/or data signals from one or more of the local controllers of the plurality of flow meter units, and based on the alerts, warning, and/or data signals received, issue alerts and/or warnings to one or more pre-designated alert and/or warning recipients which include but are not limited to the property owner, condominium maintenance staff, or others selected to receive the issued alerts and/or warnings.

In various embodiments the method and apparatus can, based on a set of predesignated conditions and/or parameters, cause one or more of the control valves of the plurality of flow meter units operatively connected to the method and apparatus to close where the data received by the method and apparatus cause the method and apparatus to determine that the one or more of set of predesignated conditions and/or parameters has been satisfied. In various embodiments, closing one or more of the control valves of the plurality of flow meter units operatively connected to the method and apparatus automatically shut off water to each particular unit for which the method and apparatus caused the control valve to close.

In various embodiments the method and apparatus, over a predesignated monitoring time period, substantially continuously monitors and measures extremely accurate water flow, water pressure, and/or temperature data received from each of a plurality of flow meter units where these flow meter units are operatively connected to a plurality of water consumption units at one or more building complexes. In various embodiments the water consumption units can be condominium units.

In various embodiments the predesignated monitoring time can be at least 1, 2, 3, 4, 5, 6, 7, 8, 9, 10, 11, 12, 13, 14, 15, 16, 17, 18, 19, 20, 21, 22, and 23 hours, 1, 2, 3, 4, 5, 6, 7, 8, 9, 10, 12, 14, 16, 18, 20, 22, 24, 26, 28, and 30 days, 1, 2, 3, 4, 5, 6, 7, 8, 9, 10, and 11 months, 1, 2, 3, 4, 5, 6, 7, 8, 9, and 10 years. In various embodiments the predesignated monitoring time can be within a range of between any two of the above specified times (e.g., between 1 and 10 hours, between 5 and 30 days, between 3 and 6 months, etc.).

In various embodiments during continuous monitoring the method and apparatus will receive information and/or data signals from each of the operatively connected flow meter units at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, 45, 50, 55, 60 times a second; or at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, 45, 50, 55, 60 times an hour; or at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, 45, 50, 55, 60 times a day; or at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, 45, 50, 55, 60 times a week; or at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, 45, 50, 55, 60 times a month; or at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, 45, 50, 55, 60 times a year. In various embodiments the number of information and/or data signals received from each of the operatively connected flow meters within a particular time period can be within a range of between any two of the above specified times (e.g., between 1 and 10 signals each second, between 5 and 30 signals each days, etc.).

In various embodiments the method and apparatus can identify and warn of extremely small pinhole leaks in inaccessible areas of one or more of the monitored water consumption units such as leaks within walls, floors, and ceilings. In various embodiments the method and apparatus can identify the extremely small leaks by continually measuring precise water flow in one or more of the monitored water consumption units, and by setting predefined audit parameters to compare the data and/or information received from the one or more monitored water consumption units. For example, in one embodiment the method and apparatus can set a predefined audit parameter of a leaking condition where a small but continuous flow is measured at one or more of the monitored water consumption units during a predefined reporting period.

In various embodiments the method and apparatus can set a predefined clock reporting period during which predefined clock reporting period it is expected that the water consumption for one or more water consuming units will be zero or very low usage.

In various embodiments the method and apparatus can set the predefined clock reporting period to be between 1 a.m. and 4a.m. because during this time period, even where a water consumption unit is occupied, the water consumption unit is typically expected to have no water consumed or at most only sporadically consumed. If the method and apparatus during this predefined clock reporting period in fact measure flow, the method and apparatus can issue a warning and/or alert to one or more predefined alert receiving parties, such as a person or individual listed in a predefined alert receiving party database for the particular water consuming unit for which flow was measured during the predefined clock reporting period. In this situation the alert would signify a use of water at a time when no use was typically expect, thereby indicating a likelihood of a leak at the water consumption unit, such leak being caused by one of the water consuming devices such as a faulty toilet.

In various embodiments the method and apparatus can set a predefined clock reporting period based on the "status of occupation" of one or more of the water consumption units operatively connected to the method and apparatus. For example, in one embodiment the method and apparatus can start a predefined clock reporting period based on the receipt of a signal from one of the water consuming units the is placed in "unoccupied mode". During this period where the water consumption unit is "unoccupied", the water consumption for this unoccupied unit is typically expected to have no water consumed or at most only sporadically consumed. If the method and apparatus during this predefined unoccupied reporting period in fact measures flow, the method and apparatus can issue a warning and/or alert to one or more predefined alert receiving parties, such as a person or individual listed in a predefined alert receiving party database for the particular water consuming unit for which flow was measured during the predefined clock reporting period. In this situation the alert would signify a use of water at a time when no use was typically expect, thereby indicating a likelihood of a leak at the water consumption unit, such leak being caused by one of the water consuming devices such as a faulty toilet.

In various embodiments the method and apparatus can perform audits for one or more of the water consuming units whose water flow units report to the method and apparatus the unoccupied status of the water consuming unit. In various embodiment the method and apparatus can issue warnings and/or alerts where the flow information or data from the water flow meter units falls outside of the calculated, derived, and/or predefined "non-leaking" water flow profile(s) and/or ranges of non-leaking flow profile(s). When falling outside of the calculated, derived, and/or predefined "non-leaking" water flow profile(s) and/or ranges of non-leaking flow profile(s), the method and apparatus can issue one or more suspicious flow trigger alert(s).

In various embodiments the method and apparatus can include an application or "app" for users (e.g., condo or water consumption unit owners) which can be downloaded by users on a portable electronic device (such as a smart phone, tablet, or portable computer) allowing the user to receive information from the method and apparatus related to the users specific water consumption unit and/or perform certain limited programming functions related to the user's specific water consumption unit such as changing the status of the water flow unit between "occupied" and "non-occupied" status indicators. In another embodiment the method and apparatus can incorporate positioning information related to a user's portable electronic device (such as a smart phone, tablet, or portable computer) wherein the user's portable electronic device is tagged or connected by the method and apparatus to the flow meter unit connected to the user's water consumption unit, and the connected portable electronic device is provided with a home location based on the location of the water consumption unit so that if the portable electronic device is determined by the method and apparatus to be located more than a predefined geographical distance from the home location, the method and apparatus can start a predefined clock reporting period based on the exceeding of the predefined geographical distance for tagged portable electronic device and the home location of the flow meter unit placing the flow meter unit in the "away mode". During this period where the water consumption unit is determined by the method and apparatus to be in the "away mode", the water consumption for this "away" unit is typically expected to have no water consumed or at most only sporadically consumed. If the method and apparatus during this predefined unoccupied reporting period in fact measures flow, the method and apparatus can issue a warning and/or alert to one or more predefined alert receiving parties, such as a person or individual listed in a predefined alert receiving party database for the particular water consuming unit for which flow was measured during the predefined clock reporting period. In this situation the alert would signify a use of water at a time when no use was typically expect, thereby indicating a likelihood of a leak at the water consumption unit, such leak being caused by one of the water consuming devices such as a faulty toilet.

Additionally, in various embodiments the method and apparatus can be operatively connected to various electronic devices in a water consumption unit such as an HVAC system and control these operatively connected electronic devices. For example, where the method and apparatus places a flow meter unit in "away" state (such as where the user travels with the previously tagged portable electronic device such as a cell phone more than 50 miles (~80.47 kilometers) from for home spot for the condominium unit or building) the method and apparatus can also automatically sets temperatures of HVAC on predefined away or economy settings, and turn off other operatively connected devices in the condominium such as a hot water heater or other appliance. When the user's tagged smart phone returns within 50 miles (~80.47 kilometers) of the home spot, the method and apparatus can cause the status of the flow meter unit to be set to "non-away" status and can also automatically sets temperatures of HVAC on predefined non-away settings, and turn on operatively connected devices in the condominium such as a hot water heater or other appliance the unit that was previously turned off by the method and apparatus.

In other embodiments the method and apparatus allows users to monitor and control their respective flow meter unit and water consumption unit. In various embodiments the method and apparatus allows a user to use a tagged portable electronic device to change the status of the flow meter unit connected to the user's water consumption unit between "non-away" and "away" states.

In various embodiments the method and apparatus can incorporate algorithms giving predictive analysis of potential water pipe failures by continually monitoring selected parameters, namely water pressures, water flows, and temperatures in a building domestic water system. Including algorithms which compensate for changes in piping pressures along with transient changes in piping pressures. For example, high-rise condominiums must use water booster pumps to enable water pressure and flow to reach all units in a building. There are many variable parameters including pressure regulators on lower floors, and additional booster pumps on other floors. The present invention preferably records and analyzes water pressures in different parts of the building continuously to determine if system parameters are in a selected proper range. Water pressures sometimes greatly exceed designed piping pressure limits leading to pipe failures and pinhole leaks. The system of the present invention preferably monitors water pressure and alerts the owner of a particular unit (or other authorized individuals) of an excess pressure condition.

In various embodiments are provided a method for monitoring a meter, comprising:
  (a) a flow meter unit
    that monitors usage of a water consuming unit or a water consuming network;
  (b) control unit
    that processes data from the flow meter unit, controls the flow meter unit, and indicates whether a water leak exists at the water consuming unit to which the flow meter unit is connected.

In various embodiments the method and apparatus causes the flow meter unit to measure and record volumetric usage of a water passing through the flow meter unit.

In various embodiments the data is processed and stored in a database that is operatively connected to the central control unit and/or the individual flow meter unit.

In various embodiments the method and apparatus can analyze for the existence of:
  (a) leak detection in the current time period;
  (b) leak detection over a period of days;
  (c) flow/direction indication;
  (d) absence of flow over a period of days; and
  (e) backflow detection.

In various embodiments the method and apparatus can determine the existence of a leak based on one or more flow meter units reporting the exceeding of measuring a predefined minimum volume during a predefined minimum time period and/or during a predefined clock period of time and/or predefined calendar period of time.

In various embodiments the method and apparatus can identify a leaking event for example if the flow volume through a particular flow meter unit continuously exceeds the predefined minimum volume for a predefined minimum time period during a predefined clock period. For example, the method and apparatus can indicate a leak if a flow meter unit measures a greater than 0.1 gallon (~378.54 milliliters) flow over multiple fifteen minute intervals during a 24 hour period, or during the period of between midnight and 6:00 a.m.

In various embodiments the method and apparatus can identify the direction of flow through particular flow meter unit and when measuring flow for a water consuming unit add flow measurements having the same direction and subtract flow measurements having opposite directions.

In various embodiments the method and apparatus can, for a predefined reporting period, identify the number of predefined time periods over which a predefined flow volume is exceeded measured by a particular flow meter unit. In various embodiments the method and apparatus can rank the level of a leak incident for a particular reporting flow meter unit based on the number of predefined time periods over which a predefined flow volume is exceeded for the predefined reporting period for a particular flow meter unit. In various embodiments 2, 3, 4, 5, 6, 7, 8, 9, and/or 10 ranking levels can be provided. In various embodiments the number of ranking levels can be between any two of the above listed ranking levels.

In various embodiments the method and apparatus can, for a predefined calendar reporting period, identify the number of reporting time periods over which a predefined flow volume is exceeded as signaled by a particular flow meter unit. In various embodiments the method and apparatus can rank the level of a leak incident for a particular reporting flow meter unit based on the number of predefined reporting time periods over which a predefined flow volume is exceeded for the predefined reporting period as signaled by a particular flow meter unit. In various embodiments 2, 3, 4, 5, 6, 7, 8, 9, and/or 10 ranking levels can be provided. In various embodiments the number of ranking levels can be between any two of the above listed ranking levels.

In various embodiments a unique identifier for a particular flow meter unit is used by the central control to identify the particular flow meter unit from a plurality of flow meter units which are operatively connected to the central control, to know from which flow meter unit the data is being received.

In various embodiments, when a leaking incident occurs for a particular monitored flow meter unit the central control unit issues an alarm signal and places the particular flow meter unit in an alarmed state by sending an alarm signal to the particular monitored flow meter unit. In various embodiments, where a leaking incident is determined for a particular monitored flow meter unit, the central control unit can display an alert warning on a monitor operatively connected to the central control warning that the particular monitored flow meter unit is identified as in a leaking state.

In various embodiments, when a leaking incident occurs for a particular monitored flow meter unit, the central control can send out at least one warning message to at least one pre-identified receiving warning message receiving party, such as the owner of the water consumption unit to which the particular monitored flow meter unit is attached.

In various embodiments of the method and apparatus, where the central control issues a leak detection warning signal for a particular flow meter unit, the method and apparatus can perform one or more of the following steps:
  (a) creating an alarm on a display operatively connected to the central control so that the display can indicate the alarm condition for the particular flow meter unit;
  (b) sending a pre-defined alarm to a pre-defined set of alarm receiving devices for receiving alarms for the particular flow meter unit.

In various embodiments data, including information on the time and duration of the leak incident for a particular flow meter unit can be recorded and stored by central control.

In one embodiment, the central control can detect and store data on multiple leak incidents simultaneously/at one time for a plurality of particular flow meter units which are being monitored by the central control. In various embodiments the information collected, stored, and/or reported by the method and apparatus can include one or more of the following:
  (a) the particular flow meter unit for which the method and apparatus issued a leak incident warning; and
  (b) the time of the leak incident warning.

In various embodiments the above information is stored by the method and apparatus for later access and/or reporting.

In various embodiments, the method and apparatus can include:

(a) a central control;
(b) a display operatively connected to the central control;
(c) a plurality of uniquely identified flow meter units operatively connected to the central control; and
(d) a plurality of warning receiving devices operatively connected to the central control.

In various embodiments the central control can be selectively programmable by a facility/user to cause the central control to immediately send an alert to one or more predefined number of predefined alert recipients in the event that the method and apparatus identifies a leak incident in one of a plurality of uniquely identified flow meter units operatively connected to the central control.

In various embodiments the method and apparatus can be selectively programmed to provide a custom defined set of pre-set alerts/alarms/messages, including text messages, telephone recording messages or emails in case of identifying a leak condition in one of a plurality of uniquely identified flow meter units operatively connected to the central control. In various embodiments the alerts/alarms/messages can be sent to recipients (a) wirelessly such as radio, cell phone, and/or blue tooth, or
(b) internet, or
(c) land lines.

In various embodiments the method comprises the following steps:

(a) providing a leak detection monitoring system having:
  (i) a central control;
  (ii) a display operatively connected to the central control;
  (iii) a plurality of flow meter units fluidly connected to a plurality of water consuming units, and operatively connected to the central control; and
  (iv) a plurality of report receiving devices operatively connected to the central control;
(b) the central control receiving data from the plurality of flow meter units, identifying a leaking incident for one of the plurality of flow meter units, and issuing a leak detection warning;
(c) the central control causing the display to show a leak detection warning for the leaking incident identified in step "b"; and
(d) the central control sending a pre-defined alert to a pre-defined set of alert recipients.

In one embodiment, the alert is customizably programmable by a user of the central control.

In various embodiments, the method and apparatus can be remotely programmable, such as through the internet or using a mobile device with a custom application.

In various embodiments each identified leak incident may appear in a daily, weekly, monthly, quarterly, semi-annual and/or annual system reports generated by the method and apparatus.

In various embodiments the plurality of uniquely identified flow meter units are each battery powered. In various embodiments the plurality of uniquely identified flow meter units have an alert warning when a battery is low.

In various embodiments, the method and apparatus can be selectively programmed to send a warning message to a predefined recipient of the leaking incident identification.

In various embodiments of the method and apparatus, the central control includes a memory which stores multiple levels of data surrounding individual identified leaking incidents, including:

(a) the time of the incident; and
(b) the time the predefined recipient indicated that the leaking incident was responded to.

In various embodiments, the method and apparatus organizes and stores in a memory data for the plurality of individually identified flow meter units that are monitored by the central control. In various embodiments the data stored in the memory is accessible by login.

In various embodiments the method and apparatus can provided a method whereby water flow measurements are taken at the building entrance and correlated with water flow measurements of each water consumption unit in the building. In various embodiments the method and apparatus can look for and analyze discrepancies between water flow volumes flowing into the main water supply for the building to the cumulative total of water volumes flowing into each water consuming unit for the building which discrepancies can indicate potential water leaks between the main inlet and piping leading to the various fluidly connected water consumption units.

In various embodiments the method and apparatus can predict building HVAC (heating, ventilation and cooling) issues by measuring cooling tower water loop pressures and temperatures, moisture sensors for condensation in HVAC pans and piping, unit temperatures and air conditioning equipment cycling times to determine if units are slowly losing cooling and/or heating efficiency. Program alerts preferably notify owners, management, maintenance personnel of changes in temperature, moisture, cycle run times, etc.

In various embodiments the method and apparatus can detect leaks in a fire suppression system for a building. In one embodiment the method and apparatus includes a flow meter unit fluidly connected to the fire suppression system. In this embodiment the highly accurate low flow meter can be set in line of a fire sprinkler suppression system coming into a building, and continually monitoring water flow. Normally, when all sprinklers are closed in a fire suppression no flow should be going through the fire suppression system notwithstanding the fact that the system is pressurized. Current fire suppression systems cannot detect very slow or minute leaks in a system. The present invention preferably detects any flow at all and is preferably monitored continually, setting alerts for suspicious flow parameters.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 15 schematically represents one embodiment of the method and apparatus with an error correcting flow look up table to obtain a correction factors for obtaining accurate flow measurements based on the flow measured by the flow meter.

FIG. 16 schematically represents one embodiment of the method and apparatus converting the analogue signals generated by the first and second sensors into a digital signal such as a square or step wave, and then using the digital square or step wave to compare with a calibrated flow lookup table such as contained in a database of calibrated flow look up tables to obtain an accurate flow measurement based on the digital square or step wave.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

General System with Multiple Flow Meter Units and Central Control

Figure 1:
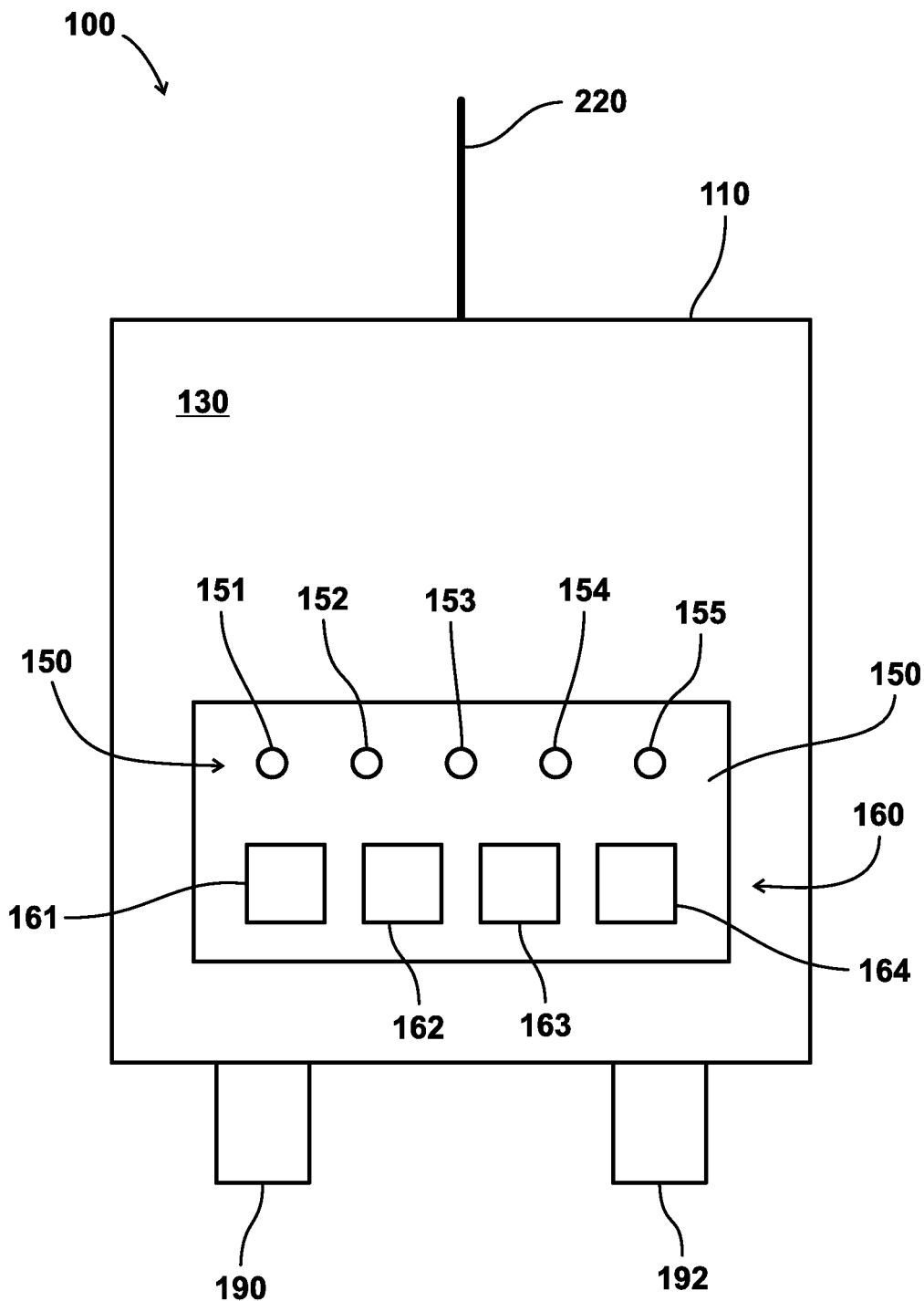
FIG. 1 is a schematic diagram of a flow meter unit that can be used in various embodiments of the method and apparatus.
Figure 2:
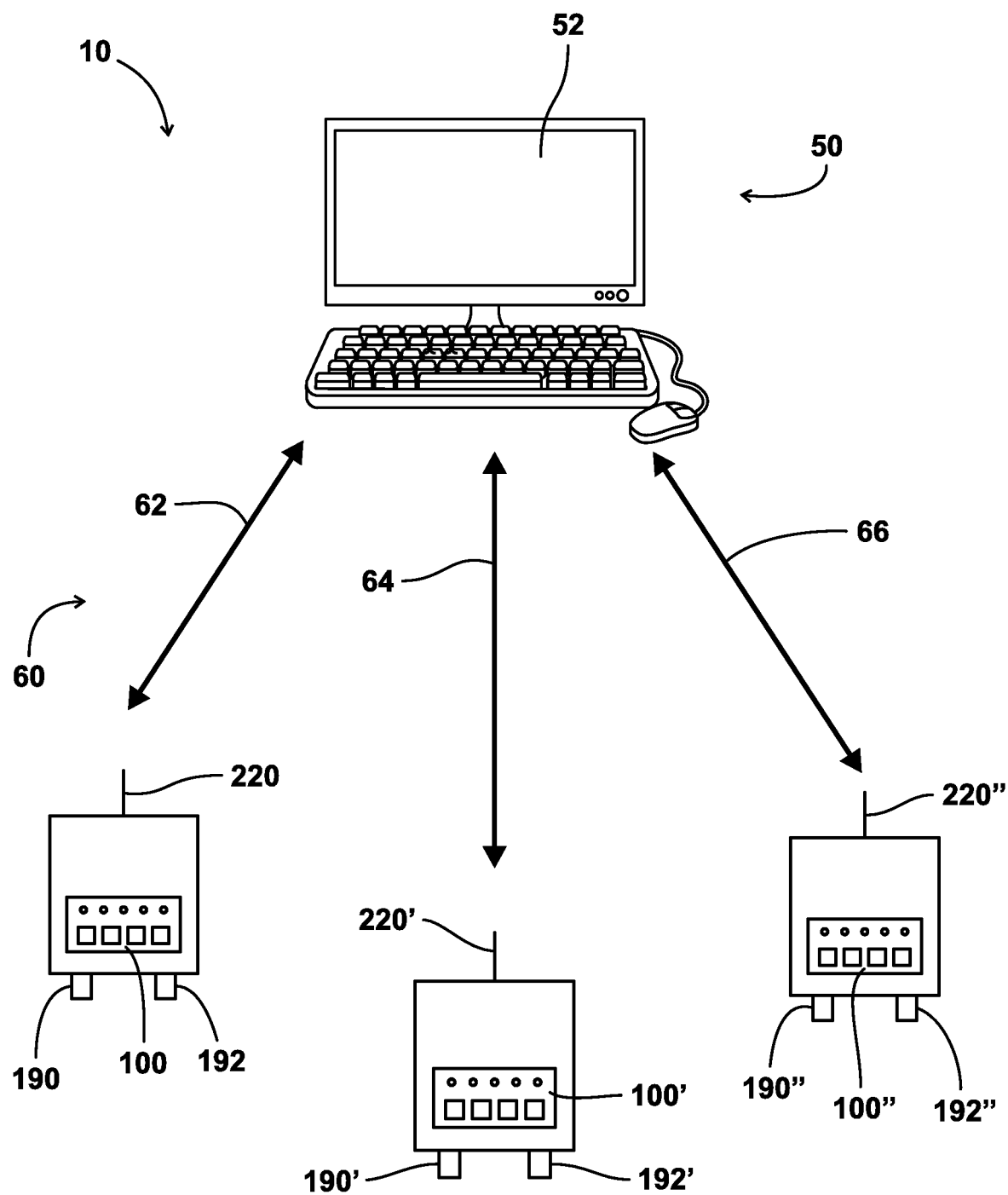
FIG. 2 is a schematic diagram of a plurality of flow meter units shown operatively connected to a central control which plurality of flow meter units can be operatively connected to specific water consumption units.
Figure 3:
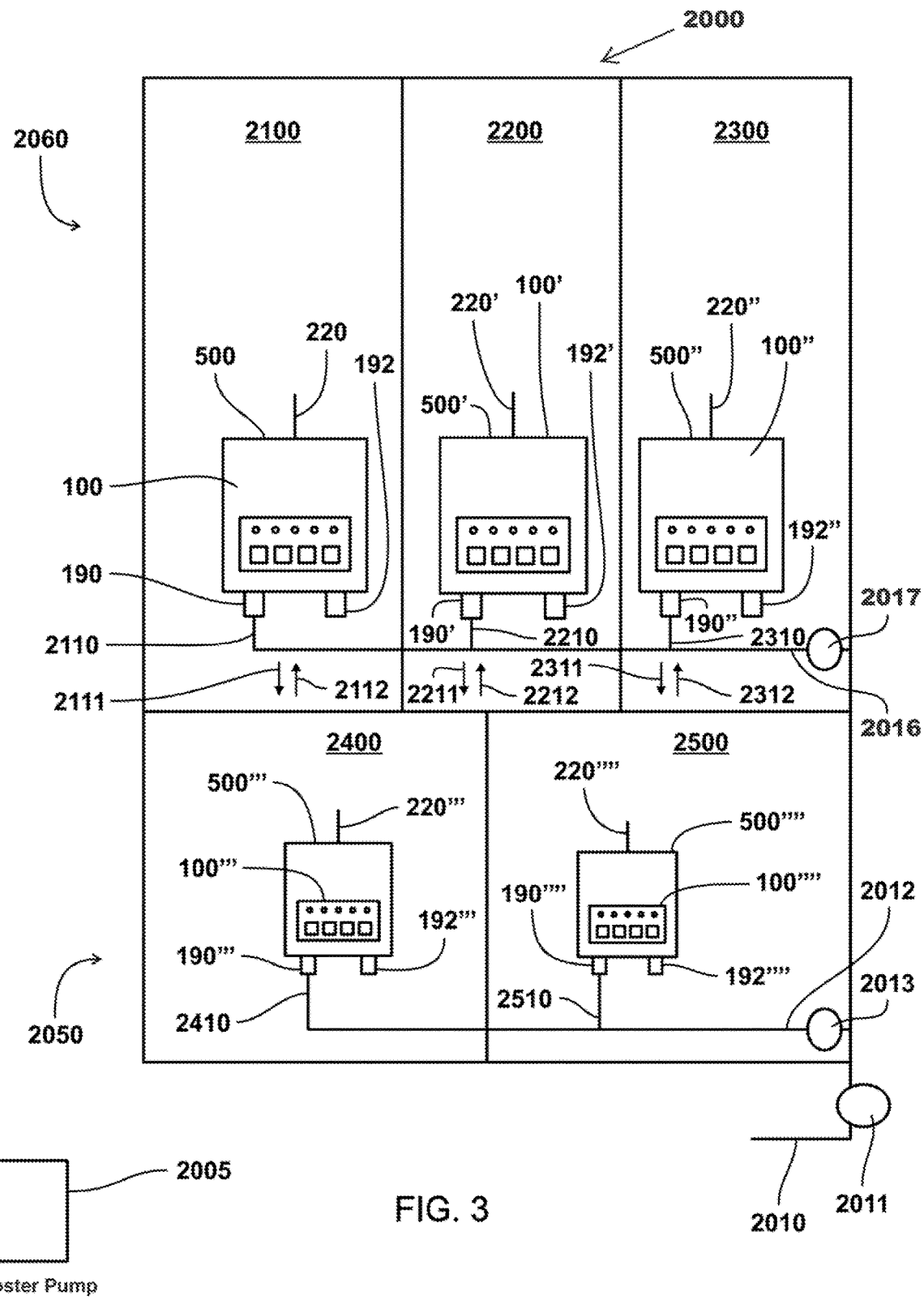
FIG. 3 is a schematic diagram of a plurality of flow meter units each shown operatively connected to individual water consumption units (such as condominiums) of a water consumption complex.

FIGS. 1 through 3 schematically diagram one embodiment of the method and apparatus 10 which can include a central control 50 operatively connected to a plurality of metering units 100, 100', 100", 100''', 100'''' which plurality of metering units are themselves respectively operatively connected to a plurality of units 2100, 2200, 2300, 2400, and 2500 of a complex 2000.

FIG. 2 schematically illustrates components of the method and apparatus 10 comprising: (a) central control 50 operatively connected to a display 52; and (b) a plurality of uniquely identified flow meter units 100, 100', 100", 100''', 100'''' operatively connected to central control 50 through plurality of connections 60. FIG. 3 schematically shows plurality of flow metering units respectively operatively connected to a plurality of units 2100, 2200, 2300, 2400, and 2500 of a complex 2000.

In various embodiments control unit 50 may be operatively connected to multiple meter units 100, 100', 100", etc. each metering unit measuring volumetric usage of water for a particular unit of a plurality of units 2100, 2200, 2300, 2400, and 2500 for a complex 2000. For example, control unit 50 can receive volumetric usage data for a particular unit from its respective metering unit 100.

Control unit 50 calculates volumetric usage for each unit based on the respective data provided by each metering unit 100.

FIG. 3 shows various metering units 100, 100', 100", 100''', 100'''' connected to an external water supply line 2010 via the metering unit's respective inlets 190, 190', 190", 190''', 190'''' Water flows from supply line 2010 through the respective metering unit's inlet 190, 190', 190", 190''', 190'''' into the units meter 500, 500', 500", 500''', 500'''' and out through the unit's outlet 192, 192', 192", 192''', 192'''' to the respective unit of the complex 2000 (e.g., unit 2100, 2200, 2300, 2400, 2500).

In various embodiments the method and apparatus 10 can be programmable regarding pre-set parameters (such as at pre-selected time intervals) that central control 50 sends out leak detection warnings, which also can be sent to pre-defined sets of warning recipients. In various embodiments, the method and apparatus 10 can be programmable regarding the sets of predefined warning recipients who will receive the warnings.

In various embodiments, the method and apparatus 10 can store in a memory a data log of the events occurring over a selected time interval, which data log can be accessed by users at a later point in time, such as by remotely logging into the method and apparatus 10. In various embodiments every leak detection warning can be stored in memory.

Plurality of Water Consuming Units Operatively Connected to the Method and Apparatus In various embodiments is provided a building-wide 2000 leak detection system is based on flow data and flow analysis software, which is auto-learning.

In various embodiments all detected water flows can be cataloged by time, date, duration, flow rate, occupancy status and other parameters to enable the method and apparatus to perform a leak probability analysis as well as using data to predict potential problems before they happen.

Figure 4:
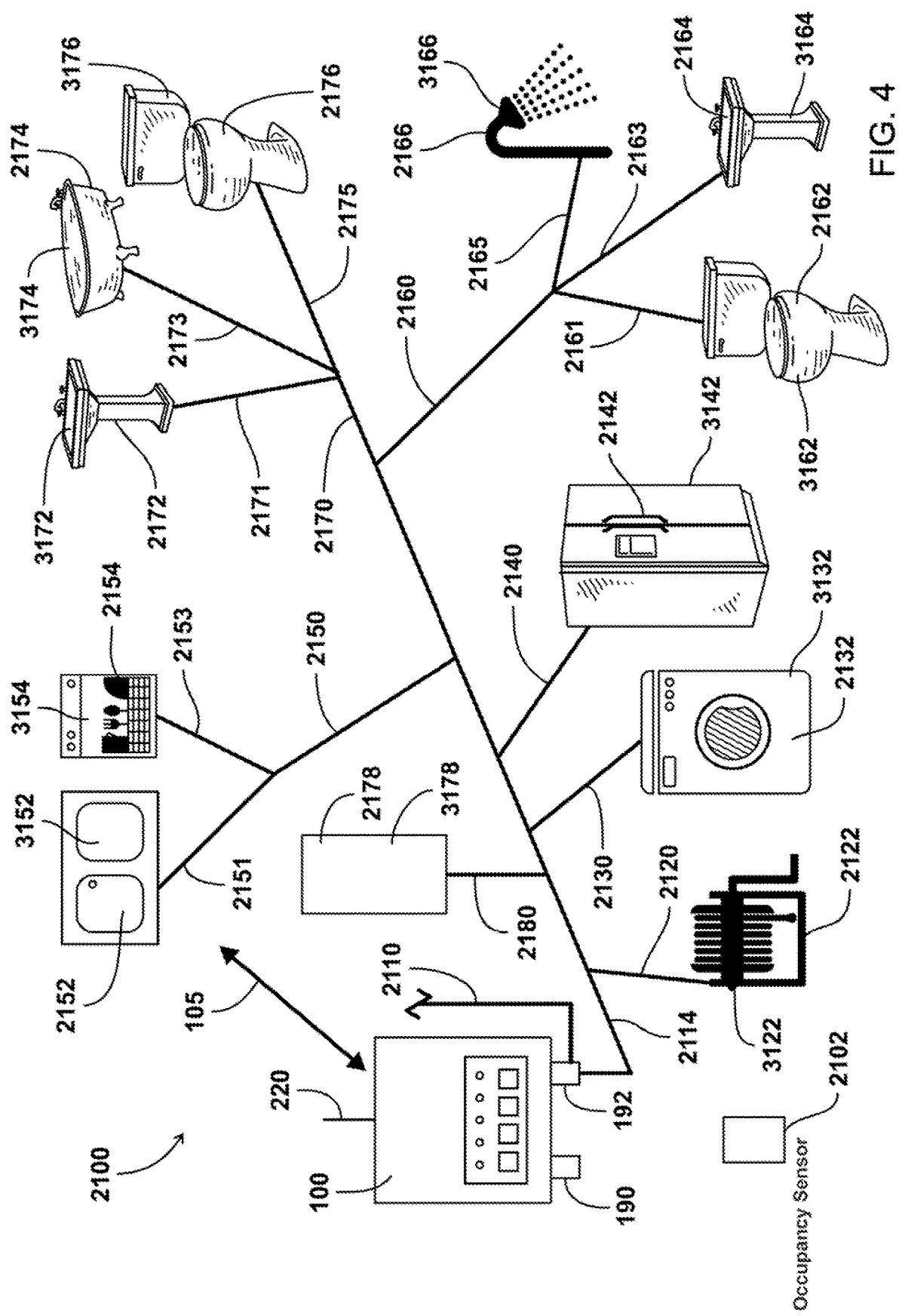
FIG. 4 is a schematic diagram of an example flow meter unit shown both measuring flow with respect to a particular water consumption unit having multiple water consumption sources and/or appliances and/or the flow meter unit being operatively connected to one or more leak detection sensors/units for the multiple water consumption sources and/or appliances.

Method and apparatus 10 can incorporate a monitoring program including two-way communication with every flow meter unit 100, 100', 100", 100"', 100"" so that the health of each condominium unit 2100, 2200, 2300, 2400, 2500 can be monitored to ensure all leak detector sensors (e.g., for water consumption unit 2100—leak detector sensors 3122, 3132, 3142, 3152, 3154, 3164, 3162, 3166, 3172, 3174, 3176, 3178, as seen in FIG. 4), are active and working as well as communicating properly with water meter unit 100. In various embodiments software can be used to control entire building systems 2000 with two way communications enabling largely expandable data capture and recording. In various embodiments method and apparatus 10 can monitor the health of all system components to determine if any components are not working or communicating properly.

Flow Meter Unit 100

In various embodiments is provided a flow meter unit 100 including customized flow meter/controller/automatic shut-off valve configuration, and flow sensing monitoring hardware and software. A flow meter unit 100 can be installed to each water consuming unit of a building or condominium complex 2000. Each such unit typically has a single input line for water supply to the water consuming unit.

In one embodiment the method and apparatus 10 includes at least one controllable metering unit 100 operatively connected to at least one building or condominium complex 2000.

The at least one metering unit 100 can include a housing 110, a flow meter 500, a local controller 200, and a control valve 1200. In other embodiments, local controller 200 can serve as a stand alone control unit 50 which control unit is addressed regarding the method and apparatus where multiple flow meter units 100, 100', 100", 100"', 100"" are operatively connected to a control unit.

Figure 5:
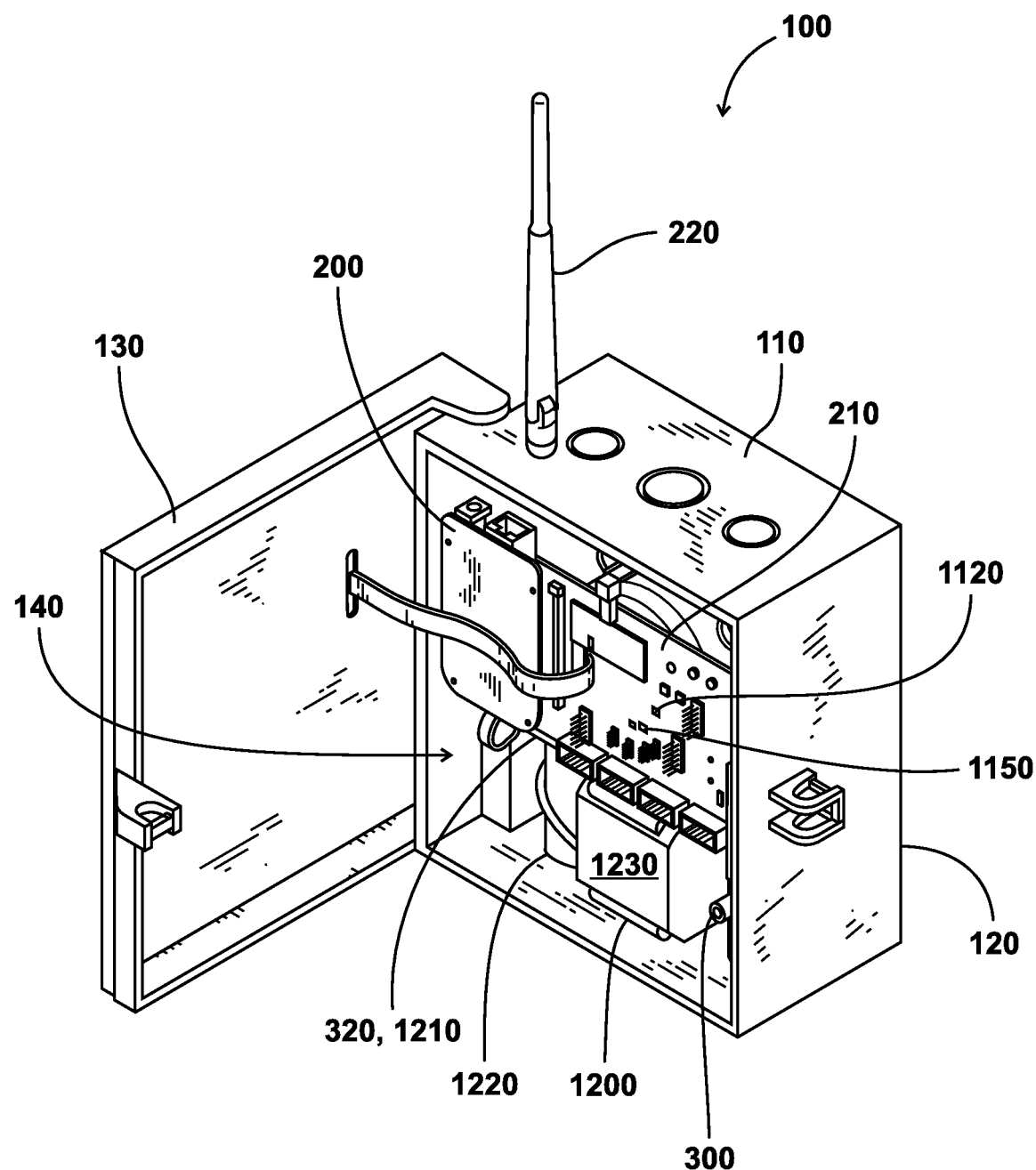
FIG. 5 is a front perspective view of a flow meter unit that can be used in various embodiments of the method and apparatus shown with its front cover open to reveal the internal components of the flow meter unit.
Figure 6:
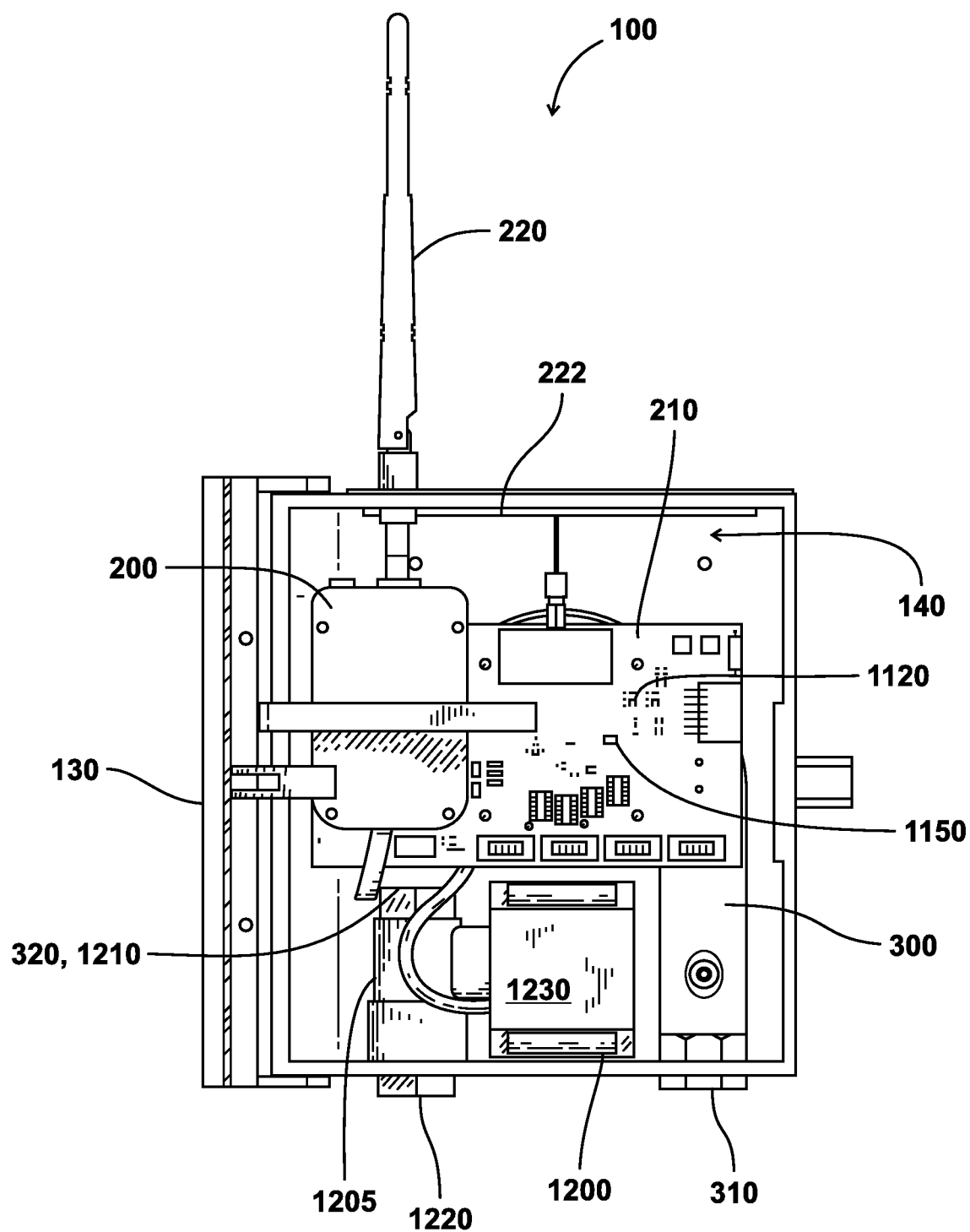
FIG. 6 is a front view of a flow meter unit that can be used in various embodiments of the method and apparatus shown with its front cover open to reveal the internal components of the flow meter unit.
Figure 7:
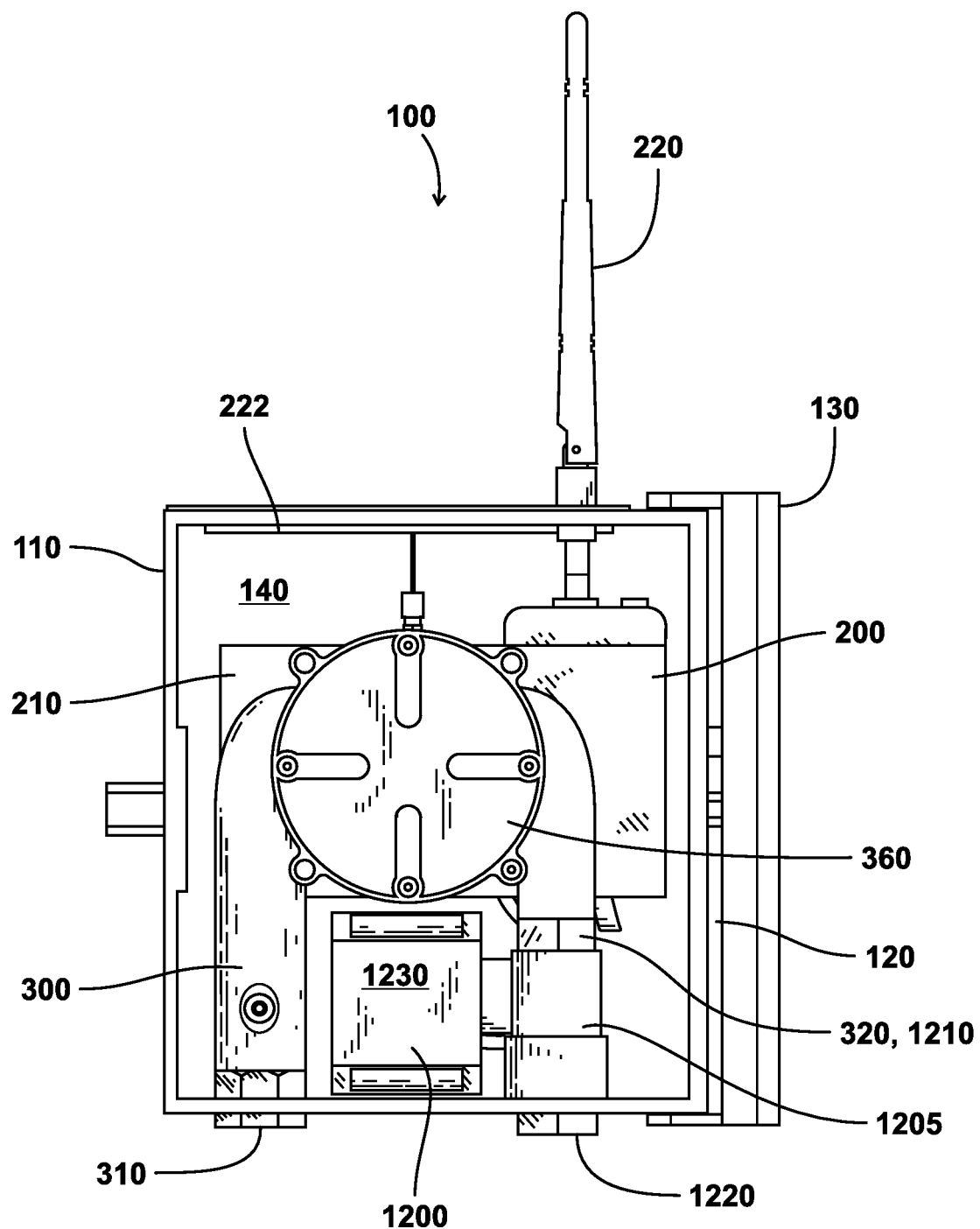
FIG. 7 is a rear view of a flow meter unit that can be used in various embodiments of the method and apparatus shown with its rear panel removed to reveal the internal components of the flow meter unit.
Figure 8:
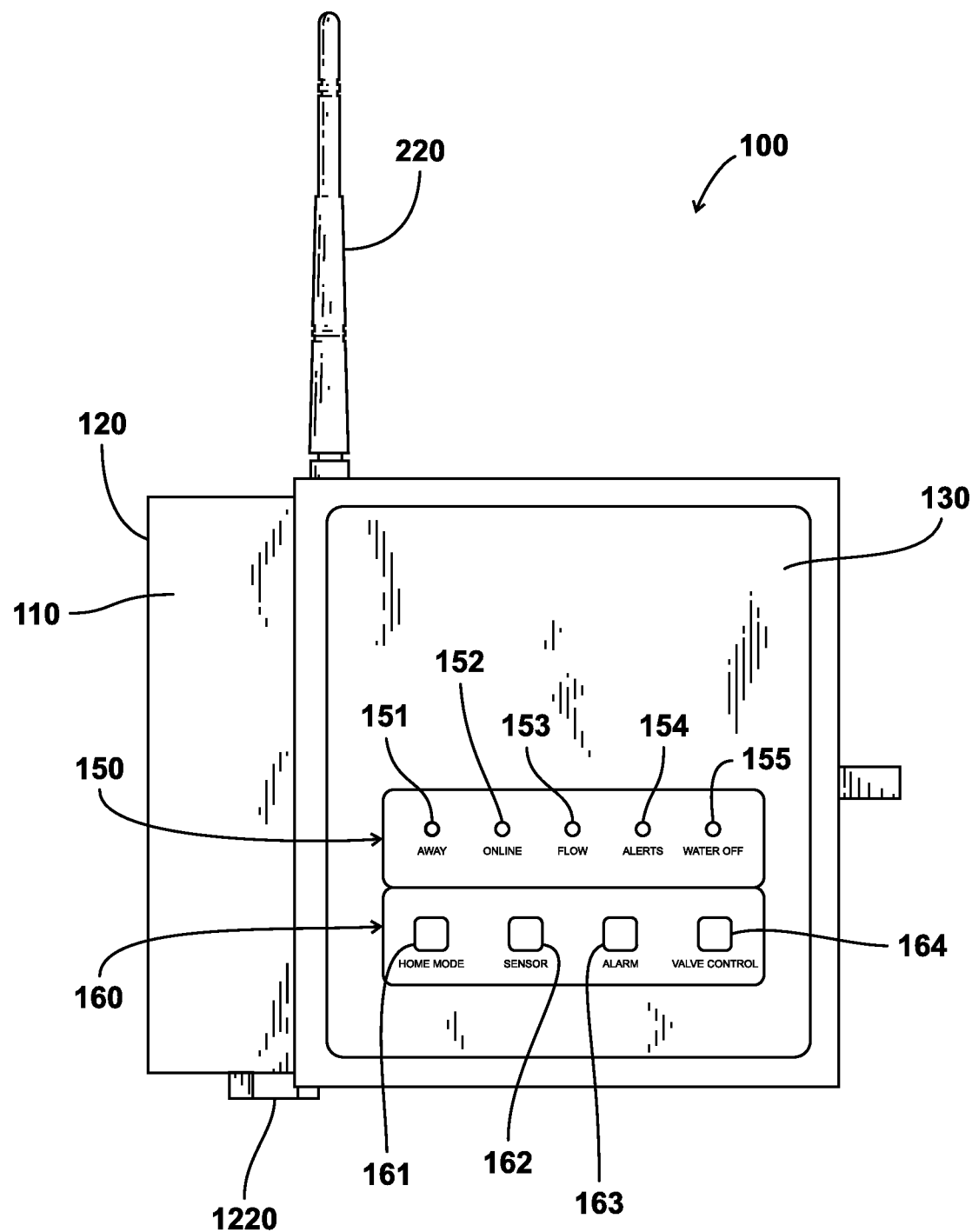
FIG. 8 is a left side view of a flow meter unit that can be used in various embodiments of the method and apparatus shown with its front panel open.
Figure 9:
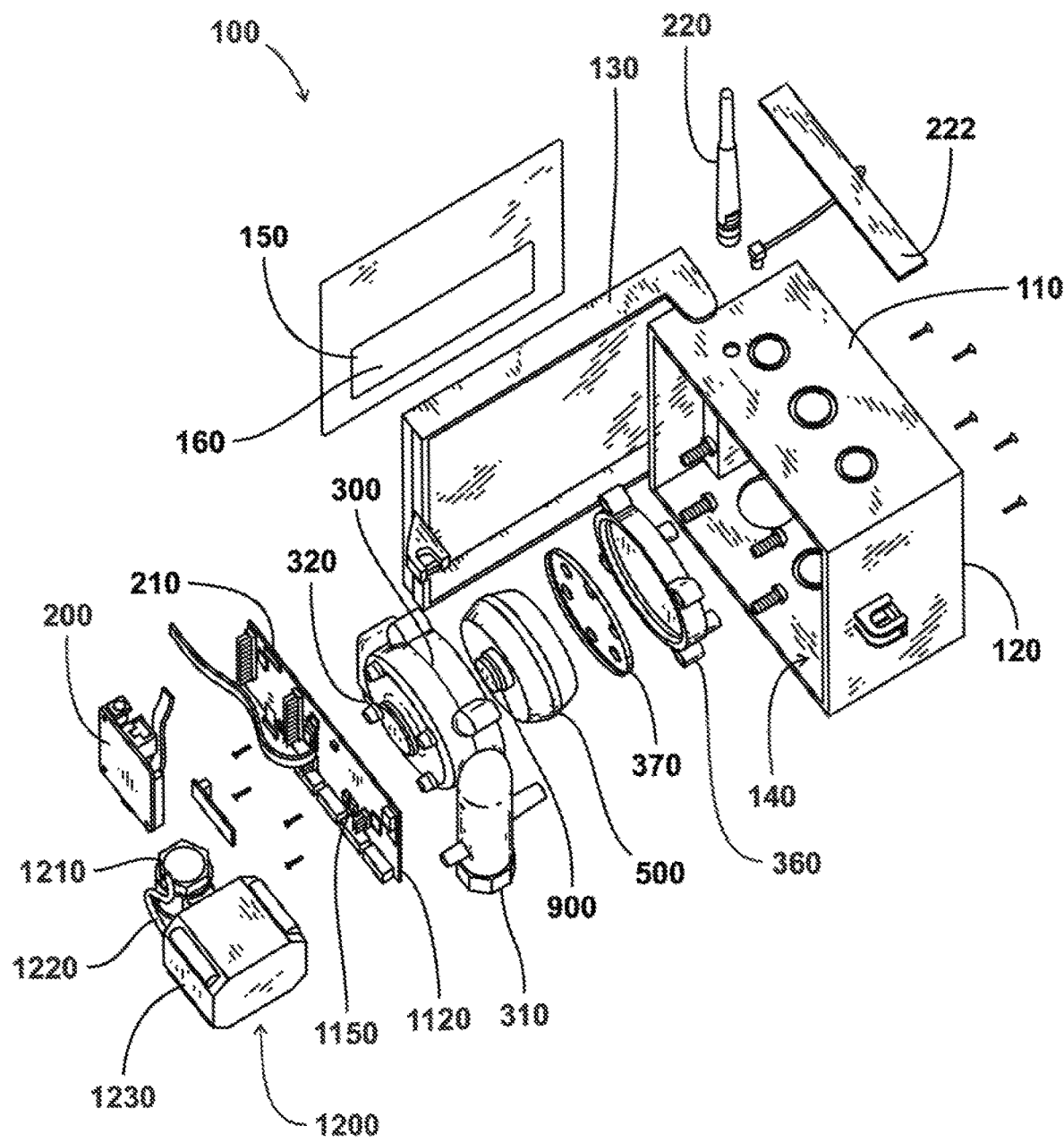
FIG. 9 is an exploded view of a flow meter unit that can be used in various embodiments of the method and apparatus.

FIG. 5 is a front perspective view of a flow meter unit 100 that can be used in various embodiments of the method and apparatus 10 shown with its front cover open 130 to reveal the internal components of the flow meter unit 100. FIG. 6 is a front view of flow meter unit 100 shown with its front cover 130 open to reveal the internal components of the flow meter unit 100. FIG. 7 is a rear view of flow meter unit 100 shown with its rear panel removed to reveal the internal components of the flow meter unit 100. FIG. 8 is a left side view of flow meter unit 100 with its front cover 130 open. FIG. 9 is an exploded view of flow meter unit 100 that can be used in various embodiments of the method and apparatus.

Housing 110 can include outlet 192 which can be fluidly connected to the single input line for the water consumption unit so that all water that particular water consumption unit must first flow through flow meter unit 100 via input 190. Water flows through flow meter unit 100, out of its outlet 192 and into the water consumption unit and its water-using components such as sink 2152, tub 2174, shower 2166, ice maker for refrigerator 2142, water heater 2178, etc.

Housing 110 can also include front cover 130 and back cover 120 which covers enclose an interior 140 that preferably contains all components. Front cover 130 can include a display/light panel 150 which contains LED's and functions as a switch cover and overlay. Display/light panel 150 includes various status indicators for the flow meter unit 100 which include: away indicator 151, offline indicator 152, flow indicator 153, warning/alert indicator 154, and shutoff mode indicator 155. Input/button panel 160 includes the following programmable input buttons: home/away mode toggle button 161, sensor bypass setting button 162, silence alarm setting button 163, and manual valve open/close toggle button 164.

A flow meter 500 is provided for measuring the amount of water that flows through the flow meter unit 100. Prior art water meters are used by water companies to determine the water usage of its customers for billing purposes. Such known meters have used a nutating disk—for example, see U.S. Pat. Nos. 4,253,341 and 4,629,404 each hereby incorporated herein by reference. The flow meter 500 can include a casing with an interior and inlet and outlet.

In various embodiments flow meter 500 can be a positive displacement flow meter. Located in interior can be a nutating disk which is operatively to a shaft having first and second ends. Attached to shaft at first end can be a plurality of rotating magnets 900 which are in the form of a disc having first and second ends. Attached to the shaft at the second end is a T-type of connection.

In various embodiments first and second magnets can be included where first magnet has first pole and second pole; and second magnet has first pole and second pole. As a circular disc first pole of first magnet can take up 0 to 90 degrees of the disc; first pole of second magnet can take up 91 to 180 degrees of the disc; second pole of first magnet can take up 181 to 270 degrees of the disc; and second pole of second magnet can take up 271 to 360 degrees of the disc.

Each metering unit 100 can include a positive displacement flow meter rotatively connected to a magnet (such as a four pole magnetic disc) and a magnetic flux sensor such as a plurality of sensors (e.g., first sensor 1120 and second sensor 1150 which sensors can be Hall sensors).

In various embodiments the metering units can include positive displacement flow meters 500 such as nutating disc type flow meters.

In various embodiments, fluid passing through the metering unit 100 causes the nutating disc to turn about its shaft. In various embodiments a plurality of magnets 900 are operatively connected to shaft so that as fluid passes through the flow meter 500, the nutating disc is caused to turn, the nutating disc turning causes the shaft to turn, and the turning shaft causing the attached plurality of magnets 900 to turn.

In various embodiments the plurality of magnets 900 can be circular and include multiple magnets (e.g. first and second magnets) which can have four poles (e.g., first magnet's first and second poles and second magnet's first and second poles), arranged about a circular disc. As the rotating shaft causes the circular disc magnet 900 to also rotate, the movement of the magnetic poles induces alternating fields of magnetic flux which alternating flux fields are sensed by the plurality of sensors 1120, 1150 that are closely placed next to the spinning circular disc magnet 900.

Each sensor (first 1120 and second 1150 sensors) of the plurality of sensors generates changing electrical signals when the sensor is exposed to a magnetic field with changing flux polarity. By analyzing the electric signals sent by the plurality of sensors 1120, 1150 sensor the rate, volume, and direction of fluid flow through the metering unit 100 may also be determined by analyzing the number and rate of signals generated by the plurality of sensors 1120, 1150.

Flow meter unit 100 collects flow and/or volume data based on nutating movements of nutating disc which through the T-connection on shaft causes rotation of shaft and attached magnet 900, and this data is transmitted to control unit 200 (and possibly also to control unit 50 either via a hard wire and/or wireless 220 connections). In alternative embodiments, other external devices could be used such as a laptop computer, a data logger, or other suitable devices known in the art.

As the water flows through the meter unit 100, the water forces the nutating disc to nutate which nutation causes shaft to rotate. The rotating shaft in turn rotates a circular magnetic disc 900 that is connected to shaft.

Magnetic disc 900 in this embodiment is shown with four separate magnetic zones (labeled "N" and "S" for the polar orientation of each zone) that make up a four pole magnet. In other embodiments, different configurations of magnets could be used. As the magnetic disc 900 rotates, it changes the magnetic flux polarity for the plurality of sensors 1120 and 1150 that are located close to disc 900. The changes in polarity induce signals that are generated by the plurality of sensors 1120 and 1150. These signals represent data concerning the water flow through metering unit 100. More specifically, the stream of signals corresponds to the rate and direction of the water flow through metering unit 100.

The flow rate of the water through metering unit 100 can be calibrated to the rate of nutation of nutating disc, rotation of shaft, and rotation of magnetic disc 900, and the signal stream generated by the plurality of sensors 1120 and 1150. Multiple sensors 1120 and 1150 can be used to be able to determine the direction of water flow through metering unit 100 based on the phase shifting between the data streams supplied by sensor 1120 compared to sensor 1150 when reacting to the changes in magnetic flux caused by rotation of magnetic disc 900.

The present invention as shown in the figures uses flow meter unit 100 with nutating disc flow meter 500 changes to enable a much more accurate reading of extremely small water flow amounts to detect extremely small water leaks such as those seen in pinhole pipe leaks and other slow leak issues. Instead of utilizing a mechanical mechanism to record the movement of the nutating disc, a circuit board 210 is mounted directly to the outside of the flow meter body or housing 300 (see FIGS. 5-7 and 9).

Housing 110 has an interior 140 and includes back cover 120 and gasket 370. On this circuit board 210 are a number of sensors 1120,1150 mounted in housing 110 that can electronically record magnetic pulses caused by the movement of magnet 900 operatively connected to the moving nutating disc inside the casing.

Much slower movements of the disc can be detected. The direction of the disc movement to account for false water flow can be determined, which occurs in water consumption units such as high-rise condominiums. A nutating disk disposed within casing interior provides data and/or information related to the quantity of water flowing through water meter unit 100. Cover or back plate 360 covers the flow meter housing/enclosure 300 and interior 350 and seals the nutating disk meter 500 in the interior 350. The nutating disk meter 500 includes a disk operatively connected to a magnetic portion 900 that rotates at a rate corresponding to the rate of water flow through the meter 500. Sensors 1120 and 1150 on circuit board 210 are magnetically coupled to the magnet disc 900 and detect its rotation and generate a signal.

In various embodiments flow meter unit 100 can include a flow meter housing/enclosure and casting 300 configured so that the inlet/arm 310 and outlet/arm 320 are in a compact U-shaped arrangement (see FIGS. 10 and 11) that greatly reduces the space required to mount all of the equipment into a compact (e.g., 8" (~20.32 centimeters)×12" (~30.48 centimeters)×6" (~15.24 centimeters)) box configuration. This arrangement enables a savings of time, money, and labor when assembling the system. A computer controller 200 and circuit board 210 are mounted directly on the flow meter housing/enclosure and casting 300.

The flow meter housing/enclosure 300 has a unique U-shaped design to allow more contact with the nutating disk to allow more accurate measurements at low flow rates. All components (e.g., first 1120 and second 1150 sensors, controller 200, and circuit board 210) are preferably assembled directly on the flow meter housing 300 including auto shut-off valve 1200 and controller housing 110 which contains controller/computer 200, sensor reading circuit boards and RF communications and WIFI communications infrastructure.

FIGS. 5,6,7,10, and 11 illustrate that controllable valve 1200 can be nested between flow meter housing/enclosure 300 inlet/arm 310 and outlet/arm 320 and valve 1200. In these figures it can be seen water inlet/arm 310, water outlet/arm 320 and valve 1200 with valve motor drive 1230, wherein drive 1230 is nested between inlet/arm 310 and outlet/arm 320.

Circuit board 200 with multiple sensors 1120,1150 is configured around the meter 500 and housing/enclosure 300 to sense/read magnetic pulses generated by the nutating disc and by the rotating magnetic disc 900, thereby detecting and measuring water flow. This configuration enables a much more accurate detection of extremely small water flows through flow meter unit 100.

FIG. 4 schematically indicates the operative connection between flow meter unit 100 and the one or more leak detector sensors which can be placed in areas where one or more the possible leak sources exist in water consumption unit such as leak detector 2122 for hose 3122, leak detector 2132 for washing machine 3132, leak detector 2142 for refrigerator with ice maker 3142, leak detector 2152 for sink 3152, leak detector 2154 for dishwasher 3154, leak detector 2162 for toilet 3162, leak detector 2164 for sink/vanity 3164, leak detector 2166 for shower 3166, leak detector 2172 for sink/vanity 3172, leak detector 2174 for bathtub 3174, leak detector 2176 for toilet 3176, and leak detector 2178 for water heater 3178. These leak detecting units can be connected to the controller of water flow unit 100 through various conventional methods such as wireless using antenna 220 and/or hard wired to controller 200.

Antenna 220 can be a dipole antenna that receives communication from several (e.g., eight to ten) sensors that are each placed in a particular building or condominium unit and in leak "suspect" locations such as sink, toilet, ice maker, hot water heater, etc. Such remote sensors are commercially available, such as those sold under the trademark FIBARO®. These remote sensors communicate via antenna 220 with controller 200.

FIGS. 5, 6 and 8 show front views of the flow meter unit 100 with a light panel 150 of lights indicating Away 151, Online 152, Flow 153, Alerts 154, and Water Off 155, and a button panel 160 of buttons including a Home Mode button 161, a Bypass Sensor button 162, an Alarm button 163, and a Valve Control button 164. The Home/Away button 161 is pressed to toggle between home mode and away mode. In away mode the away light 151 is illuminated. The Bypass Sensor button 162 is pressed to bypass a unit interior sensor that might be malfunctioning. The Silence Alarm button 163 is pressed to silence an alarm that sounds when an alarm condition is detected. The Valve Control button 164 is pressed to open or close the valve 1200 which allows water to flow through the water consuming unit that the flow meter unit 100 is connected to. The Online light 152 illuminates when the system 100 is connected to the internet. The Flow light 153 illuminates when water flows through the flow meter unit 100. The Alerts light 154 illuminates when there is an alert. The Water Off light 155 illuminates when the Valve Control button 164 is pressed to shut off water flow through the flow meter unit 100.

To fit into the tight spaces found in many condominium mechanical closets, flow meter unit 100 is preferably a compact and purpose-built system that incorporates flow meter 500, controller 200, automatic shut-off 1200, and communications systems 220,222.

Figure 10:
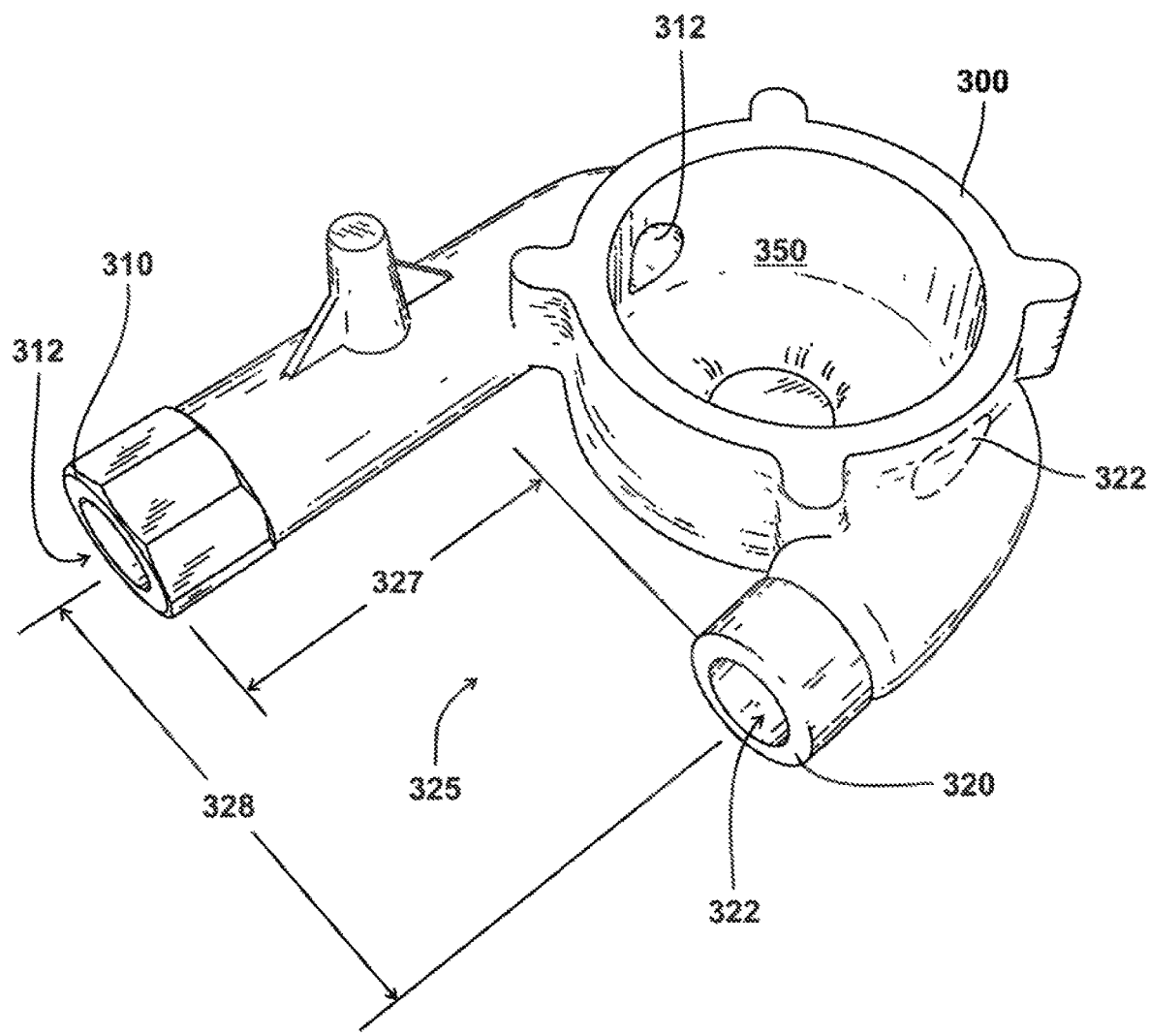
FIG. 10 is a top perspective view of the housing for the flow meter unit of FIG. 6.
Figure 11:
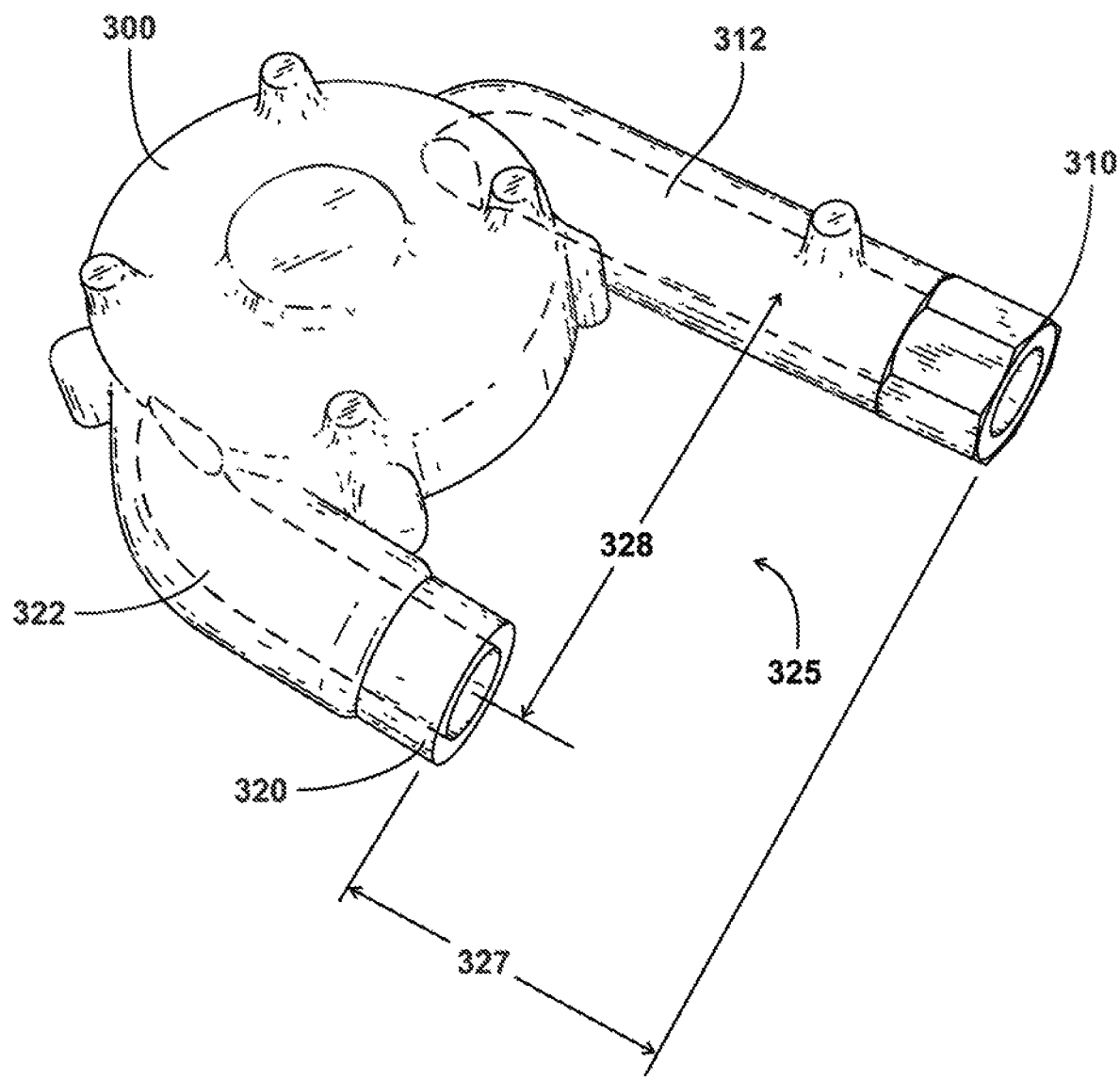
FIG. 11 is a bottom perspective view of the housing for the flow meter unit of FIG. 6.

FIG. 10 is a top perspective view of the housing 300 for the flow meter 500. FIG. 11 is a bottom perspective view of the housing for 300 which can include spaced apart housing arms 310 and 320 which arms 310 and 320 can be generally parallel. Arm 310 can have bore 312. Arm 320 can have bore 322.

Arm 310 can be spaced apart from arm 320 by dimension 328 and can have gap 325. Arm 310 can be longer than arm 320 by dimension 327. As shown in FIG. 7 arm 320 can be connected to connection 1210 of motorized valve 1200 (where portion 1205 effectively extends the length of arm 320 by dimension 327) so that motor 1230 can be nested under housing 300 between arms 310 and 320.

Housing 300 can include interior 350 which contains flow meter 500. Further, interior 350 can include a recessed area which housing magnetic disc 900 when flow meter 500 is contained in housing. Interior 350 can be fluidly connected to bore 312 and bore 322.

Increasing Accuracy by Backing Out Different Rates of Meter Error at Different Flow Rates and/or Different Differential Pressure Changes In various embodiments flow meter unit 100 can detect both the magnitude and the direction of flow passing through flow meter unit 100. The direction of flow can be detected by using two sensors 1120 and 1150 which are positioned on a circle centered on the axis of rotation of magnetic disc 900, but which are angularly offset from each, such as by 45 degrees with four pole rotating magnetic disc 900. Because sensors 1120 and 1150 are angularly offset from one another both sensors 1120 and 1150 will each register similar changes in magnetic flux caused by rotating magnetic disc 900, however, one of these two sensor's readings (e.g., second sensor 1150) will be phase shifted/offset from the other these two sensor's readings (e.g., first sensor 1120).

Figure 12:
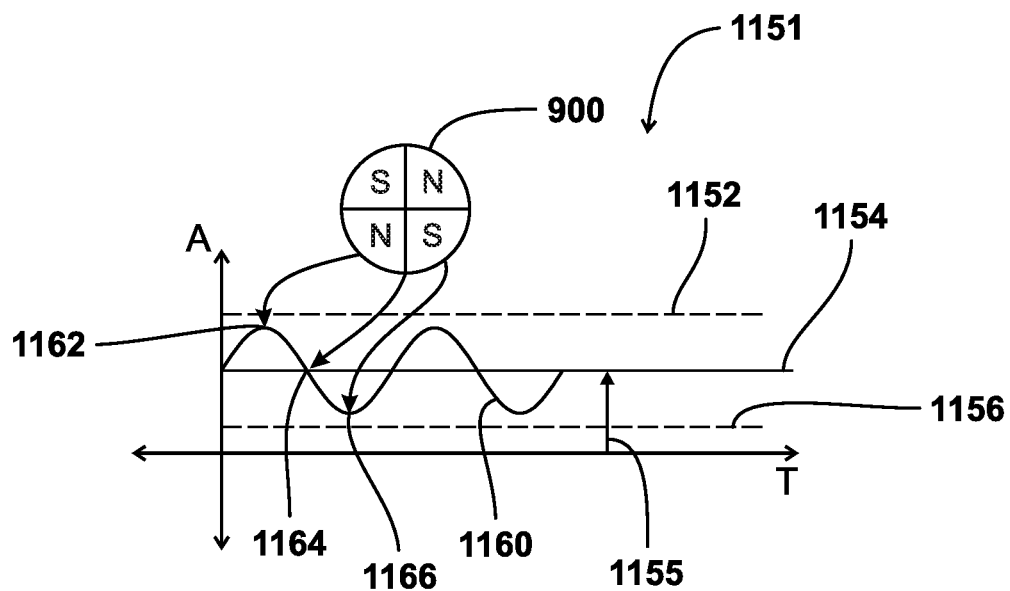
FIG. 12 is a schematic diagram representing an exemplar signal curve generated by a first one of the plurality of sensors for the flow meter unit of FIGS. 4 and 6 where flow occurring in one of the multiple water consumption sources and/or appliances in the water consumption unit causes the nutating disc to turn, which turning causes the operatively connected magnet disc to turn, and which turning causes the first one of the sensors to generate a signal based on changes in magnetic field generated by turning of the magnet disc.

FIG. 12 is a schematic diagram 1151 representing an exemplar signal curve 1160 generated by a first one 1120 of the plurality of sensors 1120,1150 for the flow meter unit 100 where flow occurring in one of the multiple water consumption sources and/or appliances in the water consumption unit 100 causes the nutating disc to turn, which turning causes the operatively connected magnet disc 900 to turn, and which turning causes the first one 1120 of the sensors 1120,1150 to generate a signal based on changes in magnetic field generated by turning of the magnet disc 900. Signal curve 1160 is a sine wave with upper amplitude 1152 (occurring at point 1162), center 1154 (occurring at point 1164), and lower amplitude 1156 (occurring at point 1166). Signal bias or offset 1155 can be calculated so that offset zero amplitude 1154 can be determined for wave 1160.

Figure 13:
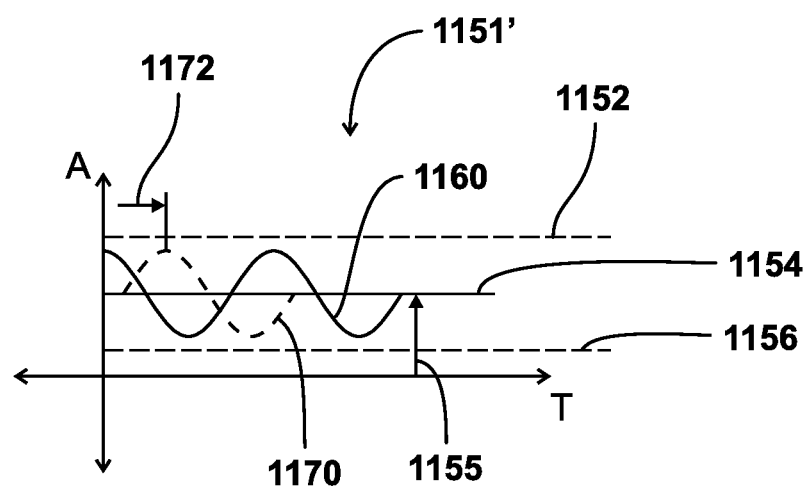
FIG. 13 is a schematic diagram representing an exemplar signal curve generated by a second one of the plurality of sensors for the flow meter unit of FIGS. 4 and 6 where the same flow referred to in FIG. 12 causes the nutating disc to turn, which turning causes the operatively connected magnet disc to turn, and which turning also causes the second one of the sensors to generate a signal based on changes in magnetic field generated by turning of the magnet disc, wherein the signal generated by the second sensor will be phase shifted compared to the signal generated by the first sensor and said phase shifting can be used by the method and apparatus to determine the direction of rotation of the magnetic disc along with the direction of rotation of the nutating disc thereby determining the direction of flow relative to the flow meter unit and the water consumption unit (e.g., whether flow is going into or out of the water consumption unit).

FIG. 13 is a schematic diagram 1151' representing an exemplar signal curve 1170 generated by a second one 1150 of the plurality of sensors 1120,1150 for the flow meter unit 100 where the same flow causes the nutating disc to turn, which turning causes the operatively connected magnet disc 900 to turn, and which turning also causes the second one 1150 of the sensors to generate a signal based on changes in magnetic field generated by turning of the magnet disc 900, wherein the signal generated by the second sensor 1150 will be phase shifted compared to the signal generated by the first sensor 1120 and said phase shifting can be used by the method and apparatus 10 to determine the direction of rotation of the magnetic disc 900 along with the direction of rotation of the nutating disc thereby determining the direction of flow relative to the flow meter unit 100 and the water consumption unit 2100 (e.g., whether flow is going into or out of the water consumption unit 2100). Second signal curve 1170 is also a sine wave with upper amplitude 1152, center 1154, and lower amplitude 1156, but shifted in relation to first curve 1160, with the direction of shifting schematically shown by dimension 1172. The direction of shifting 1172 is used by method and apparatus 10 to determine the direction of flow through flow meter 500.

Figure 14:
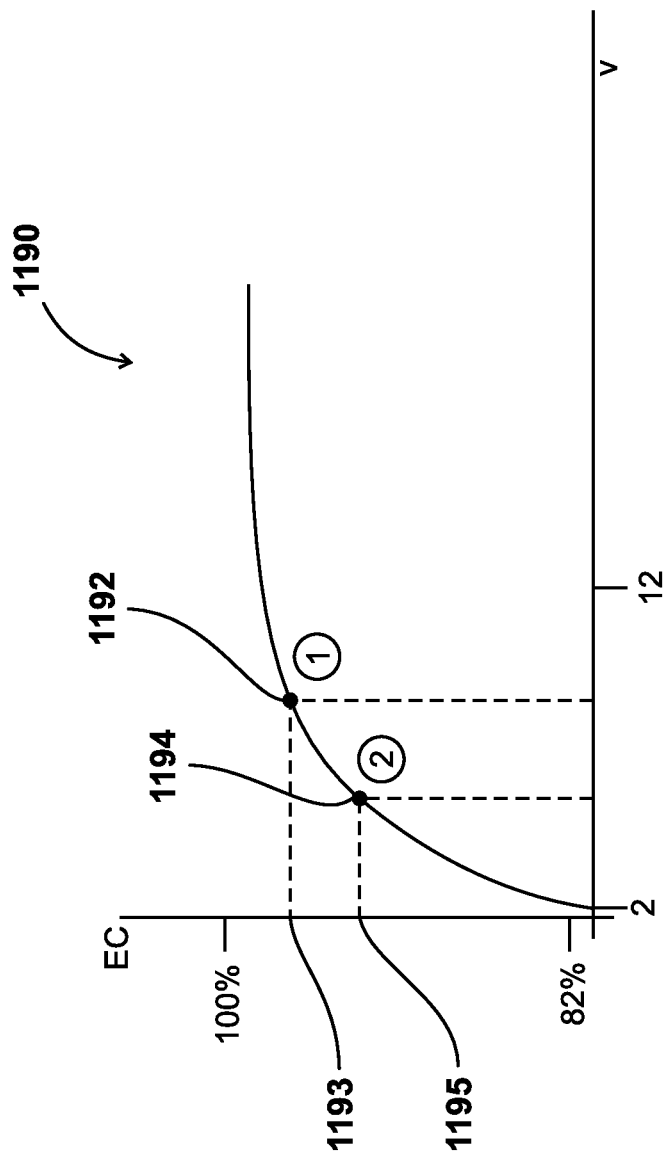
FIG. 14 schematically represents one embodiment of the method and apparatus with an analogue to digital conversion circuit.

FIGS. 14 and 15 schematically represent one embodiment of the method and apparatus 10 converting the analogue signals generated by the first 1120 and second 150 sensors into a digital signal such as a square or step wave, and then using the digital square or step wave to compare with a calibrated flow lookup table such as contained in a database of calibrated flow look up tables to obtain an accurate flow measurement based on the digital square or step wave.

The direction of rotation of magnetic disc 900 can be determined by looking at whether the readings from second sensor 1150 are phase shifted forward or backward relative to the readings from first second 1120. If the readings from second sensor 1150 are phase shifted forward relative to the readings from first sensor 1120 then magnetic disc 900 is rotating in a direction from second sensor 1150 to first sensor 1120. On the other hand, if the readings from second sensor 1150 are phase shifted backward relative to the readings from first sensor 1120 then magnetic disc 900 is rotating in a direction from first sensor 1120 to second sensor 1150. In various embodiments, using the relative phase shifting of signals from first 1120 and second 1150 sensors, the method and apparatus 10 assigns both a magnitude and direction of flow readings passing through flow meter 500. By assigning both a magnitude and direction to flow readings the method and apparatus 10 can obtain a more accurate net flow into and/or out of a particular water consumption unit (e.g., water consumption unit 2100 of building complex 2000).

Error Caused by the Relative Amount of Water Flow Circumventing Nutating Disc

Nutating disc flow meters 500 are believed to lose "measurement sensitivity" (i.e., accuracy) as the flow rates being measured by the meters 500 are decreased. For nutating disc flow meters 500 it is believed that the rate of flow bypassing the nutating disc of the flow meter 500 remains relatively constant for a wide range of flow rates passing through the meters. This "relatively constant rate of bypass flow" fails to cause rotation of the nutating disc (only the flow not bypassing the disc will cause disc turning) and thereby cause a "smaller" reported flow rate to be measured compared to the actual flow passing through the nutating disc flow meter 500. As the actual flow rate becomes smaller and smaller the "relatively constant rate of bypass flow" causes a larger and larger amount of error in the measured flow rate.

In various embodiments method and apparatus 10 can increase measurement accuracy of flow meter 500 in flow meter unit 100 by taking into account varying amounts of error in measuring flow of flow meter 500 based on the rate of flow passing through flow meter 500. The varying amount of error in measured flow rate based on changes in flow rate caused flow meter 500 provide "non-linear" measurements of flow. In non-linear measurements of flow the measured mount of flow rate passing through meter 500 does not linearly vary with the actual amount of flow rate passing through meter 500.

In various embodiments method and apparatus 10 compensates for the varying amounts flow rate measurement error by backing out the measured flow rate error as a function of measured flow rate. In various embodiments the method and apparatus 10 reduces the non-linearity of flow measurements using nutating disc flow meters 500, thereby allowing the use of far simpler linear-system methods for determining the presence of leaks.

For very small flow rates, a certain amount of the water flowing through the nutating disc flow meter 500 will pass through small gaps between the nutating disc and the casing of flow meter 500 and such circumventing flow will not cause a rotation of nutating disc thereby causing the measured amount of rotation of the nutating disc (via connected magnetic disc 900 and sensors 1120,1150) to not accurately correlate to the actual amount of flow through flow meter 500.

The amount of water flow entering gaps and circumventing rotation of nutating disc is believed to increase based on the amount of mechanical friction resistance to relative rotation between nutating disc and the flow meter's housing. It has been found that as the rate of actual flow drops below 20 to 25 ounces (~591.47 milliliters to 739.34 milliliters) per minute, the accuracy (and sensitivity) of the nutating disc flow meter 500 also begins to drop.

In various embodiments experiments can be performed with flow meter 500 where various different known flow rates are passed through flow meter 500 and flow meter 500's measured flow rate is recorded. As the actual flow rates are lowered the measured flow rate can be compared to the actual flow rate and an actual versus measured flow rate curve can be created. In various embodiments a table of actual versus measured flow rates can also be created.

In various embodiments a table and/or database of correction factors for actual flow volumes and/or rates can be created where the correction factors in the table allow determination of corrected flow volumes and/or rates based on the reported measured flow rates where the correction factors are based on comparisons/experiments of actual flow rates to measured flow rates for flow meter 500.

In various embodiments an error correction algorithm can provide error correction to reported flow rate indicia which allow for correction (error reduction) in reported flow volume/rate indicia which corrected/error reduced flow volume/rate indicia is closer or more accurate to the actual flow volume/rate passing through a flow meter unit 100. In various embodiments a plurality of known flow volumes (or rates) are passed through a flow meter 500 and then, for this plurality of known flow volumes/rates, a comparison is made between the reported measured flow indicia to the plurality of known flow volumes/rates to obtain a set of flow indicia correction factors.

Database of Flow Indicia and Correction Factors. The set of flow indicia correction factors for low flow rates/volumes can be placed in a database of flow correction indicia factors.

(i) Matching. Where the measured flow indicia values falls within a predefined range of measured flow indicia values for correction, the method and apparatus 10 can look up the matching measured flow indicia correction value to obtain a correction factor for the measured flow indicia value.

(ii) Interpolation. Where the reported flow indicia value (a) falls within a predefined range of flow indicia values for correction, (b) but does not match one of the measured flow indicia correction values, the method and apparatus 10 can interpolate between the nearest most upper (1) and (2) lower flow indicia values where the measured flow indicia falls in between in the database to obtain by interpolation algorithms (e.g., such as straight line interpolation) a correction factor for the particular measured flow indicia value.

(iii) Extrapolation. Where a reported measured flow indicia value (a) falls within the predefined range of flow indicia values for correction, (b) but does not either match one (or fall between two) of the measured flow indicia correction values, the method and apparatus 10 can extrapolate from the nearest most (1) lower or higher flow indicia value in the database to obtain by extrapolation algorithms (e.g., such as straight line extrapolation) a correction factor for the measured flow indicia value.

(iii) Function/Curve Flow Of Indicia and Correction Factors. In various embodiments the set of measured flow indicia and corresponding correction factors for the measured flow indicia obtained can be curve fitted to obtain a function/curve of correction factors/corrected flow/volumes to measured flows/flow volumes. Where the reported flow indicia values falls within the predefined range of flow indicia values for correction, the fitted curve and measured flow/volume can be used by the method and apparatus 10 to obtain correction factor for the measured flow indicia value and corrected actual flow/flow volume.

In various embodiments a corrected flow indicia value can be obtained by the method and apparatus 10 applying the particular correction factor for the measured flow indicia value selected by the method and apparatus to the particular measured flow indicia value. In various embodiments a set of corrected flow indicia values for a set measured flow indicia values can be obtained by the method and apparatus 10, for each measured flow indicia value in the set, applying the particular correction factor for the particular measured flow indicia value selected by the method and apparatus 10 to the particular measured flow indicia value to obtain a particular corrected actual flow/flow volume.

In various embodiments the maximum measured flow rate indicia for correction can be less than 22, 21, 20, 19, 18, 17, 16, 15, 14, 13, 12, 11, 10, 9, 8, 7, 6, 5, 4, 3, 2, and 1 ounces per minute (~650.618, 621.044, 591.471, 561.897, 532.324, 502.75, 473.176, 443.603, 414.029, 384.456, 354.882, 325.309, 295.735, 266.162, 236.588, 207.015, 177.441, 147.868, 118.294, 88.7206, 59.1471, and 29.5735 milliliters per minute). In various embodiments the maximum measured flow rate indicia for correction can fall within a range of between any two of the above referenced maximum measured flow rate indicia for correction.

In various embodiments the minimum measured flow rate indicia for correction can be greater than 0.01, 0.05, 0.075, 0.1, 0.2, 0.25, 0.3, 0.4, 0.5, 0.6, 0.7, 0.75, 0.8, 0.9, 1, 2, 3, 4, 5, 6, 7, 8, 9, and 10 ounces per minute (~0.2957353, 1.478676, 2.2180147, 2.95735, 5.91471, 7.393382, 8.87206, 11.8294, 14.7868, 17.7441, 20.7015, 22.18015, 23.6588, 26.6162, 29.5735, 59.1471, 88.7206, 118.294, 147.868, 177.441, 207.015, 236.588, 266.162, and 295.735 milliliters per minute). In various embodiments the minimum measured flow rate indicia for correction can fall within a range of between any two of the above referenced minimum measured flow rate indicia for correction.

In various embodiments a correction factor curve for measured flow rates can be developed/created where the correction factor curve is created based on comparisons/experiments of actual flow rates to measured flow rates for flow meter 500. FIGS. 16 and 17 are examples of correction factor curves.

In various embodiments the method and apparatus 10 applies the correction factors to the measured flow rate indicia using one or a combination of the following methods: look up tables, and/or curves to the signals generated by sensors (e.g., sensors 1120 and 1150) in flow meter 500.

FIGS. 14 through 16 schematically represent one embodiment of the method and apparatus 10 converting the analogue signals (e.g., waves 1160 and/or 1170) generated by the first 1120 and second 1150 sensors into a digital signal such as a square or step wave 1186, and then using the digital square or step wave 1186 to compare with a calibrated flow lookup table 1190 such as contained in a database of calibrated flow look up tables to obtain an accurate flow measurement based on the digital square or step wave. Here, the period 1187 of square wave 1186 can be used to determine a measured flow 1188 for flow meter 500 and then lookup curve 1190 at point 1192 can be used to obtain a flow correction factor 1193.

FIG. 14 schematically shows one embodiment of an error correcting flow look up table 1190 to obtain a correction factors for obtaining accurate flow measurements based on the flow measured by the flow meter. Schematically shown on table 1190 are correction factor 1193 for measured flow 1192, and correction factor 1195 for measured flow 1194. FIG. 15 schematically represents one embodiment of an analogue to digital conversion circuit 1180. This figure also shows sine wave 1160 being input into A/D circuit 1180.

Identifying and Removing Cumulative Errors in Measured Flow Rates Over Time

Condominiums 2000 use both variable speed and standard domestic water pumps to push water up in the building unlike most residences that use hydrostatic pressures created by local water towers. These domestic water pumps cause variations in the water pressure to each building or condominium unit. When a unit is unoccupied and no water flowing, the air traps incorporated in the water piping to reduce the hammering effect of water pipes will cause water to flow slightly back and forth through the flow meter 100 when pressure variations occur thus causing false water flow. The present invention uses programmed sensors to determine the direction of the nutating disc to cancel false flows. The present invention monitors for very small water leaks that occur in piping.

Internal bore pressure changes in piping (e.g., first 2012 and second 2016 branch lines) cause differential changes in the overall internal volume of the condominium's 2000 piping that houses, contains, and/or stores water before being used in specific water consumption units (e.g., 2100, 2200, etc.). For example, increasing the internal pressure of the internal bore of branch line 2110 will tend to cause differential expansion of the internal bore(s) of the piping system/increase the length of the piping and thereby increasing the overall volume of water that can be stored in the internal bores of the piping in water consumption unit 2100's piping system. On the other hand, decreasing the internal pressure of the internal bore will tend to cause differential contraction of the internal bores of the piping system and decrease the overall volume of water that can be stored in the internal bores of the piping system. This increase and/or decrease in the bore diameter of piping may be relatively small but with longer lengths of piping in unit 2100, the overall volume change based on the change in bore diameter can be significant and lead to false indications of a leak.

Other factors causing differential changes in the overall volume of water that can be stored in a piping system include air trapped in the piping system along with other plumbing items such as hammer arresters.

Considering that the total volume of water that a piping system can store increases and decreases with changes in nominal water pressure, changes in water pressure should be considered if an accurate net flow regarding a building or structure is to be measure. For example, in condominium complex 2000, booster pumps cycling on and off cause pressure fluctuations in the piping systems as the booster pumps work to maintain tap pressures in the complex.

For example, for a three bedroom and three bath condo unit 2200, it has been found that a supply pressure increase of between 50 to 100 pounds per square inch (~344.738 Kilopascals to 689.476 Kilopascals) can additionally force into the condo unit 2200's plumbing system between 2 to 3 ounces (~59.1471 milliliters to 88.7206 milliliters) of water. Typically, the additionally forced water flows back out when the pressure drops from 100 (~689.476 Kilopascals) back to 50 pounds per square inch (~344.738 Kilopascals). It has been found with pressure fluctuations that the rates increasing pressures do not equal the subsequent rates that the pressures decrease—instead the rates are asymmetric. Typically, there are faster increases in pressure than the consequent decreases in pressure. This asymmetry in the pressure fluctuation rates are due to "quick" pressure increases being caused by a booster pump's quick action, but consequent "slow" pressure decreases because caused by the differentially pressure forced in water (to the increased pressurized piping volume) only being relieved/vented/consumed by removal or consumption of the pressure forced in water via actual consumption by occupants of the condominium (e.g., turning on a faucet). In summary, (a) the pressure rise and attendant forced in inflow happens quickly; and (b) the consequent pressure drop and attendant relieved/vented/consumed outflow happens more slowly.

FIG. 3 schematically shows a booster pump 2005 pressurizing three condominium units 2100, 2200, and 2300. Typically, booster pump 2005 will have a turn on lower pressure, and a cutoff higher pressure. For example, the lower pressure may be 75 psi (~517.107 Kilopascals) and the cutoff higher pressure may be 115 psi (~792.897 Kilopascals)—i.e., when the booster pump 2005 senses a pressure in line 2016 falling below 75 psi (~517.107 Kilopascals), it will cut on and pressurize lines to condos 2100, 2200, and 2300 until booster pump 2005 increases the pressure to 115 psi (~792.897 Kilopascals). Even if all flow usage to condos 2100, 2200, and 2300 are zero (i.e., unoccupied modes), during this increase in pressure caused by booster pump 2005, water will be forced into condos 2100, 2200, and 2300 (as described above) which forced water is schematically indicated by flow arrows 2111, 2211, and 2311. During this forced inflow into condos 2100, 2200, and 2300 a portion of the forced inflowing water will bypass the condo's respective flow meter's nutating discs thereby creating an error in the calculated flow volumes (via flow meter units 100, 100', and 100") by determining the amount of disc 900, 900', 900" rotation.

However, unlike the booster pump 2005 increasing the pressure to a pre-defined booster set point pressure, pressure in the lines to condos 2100, 2200, and 2300 can be lowered at a much smaller flow rate. For example, pressure in the lines can be lowered when one or more of the condos 2100, 2200, and 2300 experience "occupied water consumption" (e.g., in condo 2100 a sink 2152 is turned on which consumption causing the pressure in the line 2110 to condo 2100 to drop along with causing the pressure in the lines to non-using condos 2200 (line 2210) and 2300 (line 2310) to also drop (e.g., from 115 psi (~792.897 Kilopascals) to 105 psi (~723.95 Kilopascals)) but this rate of drop will be slower than the original rate of increase by the booster pump BP from 75 psi (~517.107 Kilopascals) to 115 psi (~792.897 Kilopascals). Because this "rate of pressure dropping" from 115 psi (~792.897 Kilopascals) to 105 psi (~723.95 Kilopascals) is slower, the backward flow rate through the flow meters for condos 2100, 2200, and 2300 will also be slower (schematically indicated by arrows 2112, 2212, and 2312) and with these slower flow rates the relative amount of water bypassing the respective nutating discs for the flow meters 100, 100', 100" for condos 2100, 2200, and 2300 will also be relatively higher thereby causing a higher percentage of error in the backwardly flowing volume of flows measured by the amount of nutating disc rotation.

Because the rate of error in reading flow rates at different rates of pressure changes varies, in order to get a more accurate measurement of net flow relative to a condominium, the different rates of error in flow measurements need be taken into account when determining an overall net flow relative to a condominium.

For example, where the same actual amount of water regularly flows forwardly and backwardly through a nutating disc flowmeter 500, but with the forward flow rate being larger than the backward flow rate, then the relatively amount of error in measuring backward flow will be greater than the relative amount of error in reading forward flow. Over time the nutating disc flow meter 500 in this situation would report a net forward flow (i.e., flow into the condominium) when in reality there should be a net zero flow. Measurements have found the error related to false net forward flow into a condominium to be about 10 ounces (~295.735 milliliters) per hour. A true actual leak of 10 ounces (~295.735 milliliters) per hour could have disastrous consequences if left undetected for several weeks. Further, accordingly such an error in measuring "low flow rate leaks" needs to be removed to be able to accurately detect true low flow rate leaking conditions as these "slow leaks" can cause large amounts of damage if not detected for longer periods of time and/or can be a precursor to a much larger plumbing failure which may occur in the near future.

The flow sensor preferably is able to report the net total inward flow, reporting both positive (normal inward) and negative (reverse or backflow) water flow. The reason for this feature is that all plumbing systems of any size hold a certain volume of water in the pipes themselves. Air trapped in various parts of the system such as hammer arresters, the fact that pipes are somewhat elastic, and perhaps other factors, causes this volume to increase and decrease with changes in water pressure. Experimentation has shown the volume at maximum pressure can be several ounces larger than the volume at minimum pressure. As a result, flow sensors that assume all water flow to be inward, will erroneously report this reverse flow (during times when the pressure is decreasing) as inward flow. This erroneously reported flow serves to increase the noise floor of the sensors, limiting their ability to detect leaks below perhaps an ounce (and maybe more) per minute. By tracking the net inward flow accurately, the system of the present invention is able to detect leaks well below this limit as it can cancel out backward flow.

The flow circuit essentially must detect the direction and rotational rate of the nutating disc and operatively connected disc magnet 900. As mentioned above, meter 100 registers typically employ a mating magnet and mechanism from which the flow rate is electronically sensed.

Determining Leaking Flow Profiles and Leaking States

In various embodiments the method and apparatus 10 can perform automated audits at predefined periods of time, for example late at night when there is expected to be only sporadic water flow such from an ice maker refilling.

In various embodiments the method and apparatus 10 can perform automated audits when a predefined state of the water consumption unit is identified (such as when the unit is not occupied) again being a period of time when there is expected to be only sporadic water flow such from an ice maker refilling.

In various embodiments for these auditing periods, the method and apparatus 10 preferably can identify and determine at least one type of repetitive non-leaking water flow which is likely to be seen, for example, the refilling of an automatic ice maker even when a water consumption unit is not occupied and/or during time periods of expected no or little use for the water consumption unit.

In various embodiments the method and apparatus 10 will send an alarm, warning, and/or alert to a predefined receiver of alerts such as a monitoring individual and/or service who can review current flow and determine if there is a leak or whether further investigation is needed.

In various embodiments the method and apparatus can include an automatic shut off valve 1200 fluidly connected to flow meter unit 100, and in an alert or warning condition cause the valve 1200 to shut off flow to the water consumption unit.

Auditing Time Period

In various embodiments the method and apparatus can analyze for the existence of:
  (a) leak detection in a predefined minimum time period;
  (b) leak detection over a period of days;
  (c) flow/direction indication;
  (d) absence of flow over a period of days; and
  (e) backflow detection.

In various embodiments the method and apparatus can perform audits during a predefined time period for performing audits.

In various embodiments the method and apparatus can identify a leaking event for example if the flow volume through a particular flow meter unit continuously exceeds the predefined minimum volume for a predefined minimum time period during a predefined clock period. For example, the method and apparatus can indicate a leak if a flow meter unit measures a greater than 0.1 gallon (~0.378541 Liter) flow over multiple fifteen minute intervals during a 24 hour period, or during the period of between midnight and 6:00 a.m.

In various embodiments the auditing time period can be between 12:00 midnight and 6:00 a.m., between 1 a.m. and 6:00 a.m., between 2 a.m. and 6 a.m., between 3 a.m. and 6 a.m., between 4 a.m. and 6 a.m., between 5 a.m. and 6 a.m., between 1 a.m. and 5 a.m., and between 1 a.m. and 3 a.m., between 1 a.m. and 2 a.m.

In various embodiments method and apparatus 10 can include an occupancy sensor by the front door of each condominium or building unit (e.g., sensor 2102 for unit 2100) and the auditing time period created by the unit being placed in an "unoccupied state". In various embodiments, the method and apparatus can, where there is no movement in for example a 24 hour period, switch flow meter unit 100 into an "away" mode. In various embodiments, where flow meter unit 100 is in an away mode, method and apparatus 10 can issue an alarm where a predefined flow is exceeded over a predefined flow period.

Monitoring, Warning, Alert, and/or Alarm

In various embodiments, the method and apparatus 10 can include the following steps can:

(a) a plurality of flow meter units 100, 100', being operatively connected to a plurality of water consuming units 2100, 2200, with each flow meter unit having a unique identifier; and (b) the plurality of flow meter units 100, 100' being operatively connected to a central control 50; and (c) the plurality of flow meter units 100, 100' being monitored by the central control 50 for one or more leak incidents; and (d) the central control 50 issuing a warning after the identification of a leak incident using one of the flow meter units 100, 100'.

In various embodiments method and apparatus 10 can have predefined flow parameters which if seen will cause the method and apparatus to alert users of suspicious water flow.

In various embodiments the method and apparatus 10 can determine the existence of a leak based on one or more flow meter units 100, 100', etc. reporting the exceeding of measuring a predefined minimum volume/minimum flow rate during a predefined minimum time period and/or during a predefined clock period of time and/or predefined calendar period of time.

In various embodiments the method and apparatus 10 can determine the existence of a leak based on one or more flow meter units 100, 100', 100", etc. reporting the exceeding of measuring a predefined minimum flow measurement over a predefined minimum time period and/or during a predefined clock period of time and/or predefined calendar period of time.

In various embodiments method and apparatus 10 can set an alert for a measured flow exceeding a predefined minimum flow measurement. In various embodiments method and apparatus 10 can set an alert for a measured flow both (a) exceeding a predefined minimum flow measurement and (b) where said state extends for greater than a predefined minimum time period for alarm. For example, in various embodiments the predefined minimum time period can be 30 minutes.

In various embodiments the predefined minimum flow indicia for alert can be greater than 0.01, 0.05, 0.075, 0.1, 0.2, 0.25, 0.3, 0.4, 0.5, 0.6, 0.7, 0.75, 0.8, 0.9, 1, 2, 3, 4, 5, 6, 7, 8, 9, 10, 11, 12, 14, 16, 18, 20, 25, 30, 40, 50, 60, 70, 80, 90, 100, 110, 120, 140, 150, 160, and 164 ounces per minute (~0.2957353, 1.478676, 2.2180147, 2.95735, 5.91471, 7.39338, 8.87206, 11.8294, 14.7868, 17.7441, 20.7015, 22.18015, 23.6588, 26.6162, 29.5735, 59.1471, 88.7206, 118.294, 147.868, 177.441, 207.015, 236.588, 266.162, 295.735, 325.309, 354.882, 414.029, 473.176, 532.324, 591.471, 739.338, 887.206, 1182.94, 1478.68, 1774.41, 2070.15, 2365.88, 2661.62, 2957.35, 3253.09, 3548.82, 4140.29, 4436.03, 4731.76, and 4850.06 milliliters per minute). In various embodiments the predefined minimum flow indicia for alert can fall within a range of between any two of the above predefined minimum flow indicia for alert (e.g., between 0.01 (~0.2957353 milliliters) and 10 ounces (~295.735 milliliters) a minute, between 1 (~29.5735 milliliters) and 20 ounces (~591.471 milliliters) a minute, between 3 (~88.7206 milliliters) and 5 ounces (~147.868 milliliters) a minute, etc.).

In various embodiments the predefined minimum time period can be at least 1, 2, 3, 4, 5, 6, 7, 8, 9, 10, 11, 12, 13, 14, 15, 16, 17, 18, 19, 20, 21, 22, 23, 24, 25, 30, 40, 50, and 60 minutes, 1, 2, 3, 4, 5, 6, 7, 8, 9, 10, 12, 14, 16, 18, 20, 22, and 24 hours, 1, 2, 3, 4, 5, 6, and 7 days. In various embodiments the predefined minimum time period can be within a range of between any two of the above specified time periods (e.g., between 2 and 30 minutes, between 30 minutes and 2 hours, between 3 and 5 hours, etc.).

In various embodiments the corrected minimum flow indicia can be a volume and, based on the predefined minimum time period, method and apparatus 10 can calculate an average flow rate indicia and compare the calculated average flow rate indicia to the predefined minimum flow indicia for alert specified in other embodiments above, and if exceeded issue an alarm or warning.

In various embodiments the corrected minimum flow indicia can be a volume and, based on the predefined minimum time period, method and apparatus 10 can use a minimum volume of flow over the predefined minimum time period for alert (e.g., a predefined minimum flow rate for alert times a predefined minimum time period) and compare the corrected measured flow volume indicia to the minimum volume of flow over the predefined minimum time period for alert, and if exceeded issue an alarm or warning.

For example the method and apparatus 10 can issue an alarm where flow meter unit 100 detects continual water flow exceeding a time period of 5 minutes (or whatever time is chosen by the user) to allow for ice makers to refill, issue an alarm and cause valve 1200 to be shut off, and issue an alarm notification to one or more predefined alarm recipients (such as the condominium or building maintenance staff and owner).

Plurality of Water Consumption Device Specific Leak Detectors

In various embodiments the method and apparatus 10 can include one or more flow meter units 100, 100', etc. which themselves are operatively connected to a one or more local leak detector sensors that can be specific for particular possible leak sources in a water consumption unit.

For example, FIG. 4 schematically shows for unit 2100 flow meter unit 100 operatively connected (indicated by arrows 105) to local leak detector sensors 3122, 3132, 3142, 3152, 3154, 3162, 3164, 3166, 3172, 3174, 3176, and 3178 which local leak detector sensors are positioned to directly detect leaks in the sensor's respective possible leak source (respectively hose unit 2122, washing machine 2132, refrigerator/icemaker 2142, sink 2152, dish washer 2154, toilet 2162, sink 2164, shower 2166, sink 2172, bath tub 2174, toilet 2176, and hot water heater 2178), are active and working as well as communicating properly with water meter unit 100.

In various embodiments, the method and apparatus 10 can include the following steps:

(a) a plurality of flow meter units 100, 100', being operatively connected to a particular set or local leak detector sensors, with each local leak detector being set up to detect a leak for a particular water consumption device; and (b) the plurality of flow meter units 100, 100' being operatively connected to a central control 50; and (c) the plurality of flow meter units 100, 100' being monitored by the central control 50 for one or more leak incidents; and (d) at least one of the local leak detectors of step "a" issuing a signal that water and/or a leaking condition is detect; and (e) based on the signal of step "d", the central control 50 issuing a warning signal.

In various embodiments the local controller of the flow meter unit preferably communicates with leak sensors located interior to the units and positioned in water-leak risk areas.

In various embodiments of the method and apparatus 10, each flow meter unit 100, 100', 100", etc. includes a local controller operatively connected to and communicating (e.g., wirelessly or hard wired) to a plurality of leak sensors in a water consumption unit (e.g., wirelessly via antenna 222 or by hard wiring). In various embodiment the wireless connectivity can be established and maintained via z-wave, zigbee, or other RF communication technologies and/or protocols.

In various embodiments of the method and apparatus 10, each local controller is also operatively connected to and communicating with a central controller 50 (e.g., wirelessly via antenna 220 and/or through the world wide web or internet). In various embodiment the wireless connectivity can be established and maintained via z-wave, zigbee, or other RF communication technologies and/or protocols. In various embodiments each local controller can information and/or data from its flow meter unit based on the water consumption of the unit that said flow meter unit is connected to, to the central controller.

In various embodiments the method and apparatus 10 can include additional metering exterior to the building complex 2000, such as piping flow meter units measuring total flow into building complex 2000 (e.g., flow meter unit 2011), along with possibly flow meter units on the complex's branch flow into lines on a level by level basis (e.g., flow meter unit 2013 for first level branch line 2012 and flow meter unit 2017 for second level branch line 2016).

In one embodiment method and apparatus 10, for a predefined measuring period the method and apparatus can compare flow rates/flow volumes reported as passing through flow meter 2011 with the measured flow rates passing through flow meter 2017 for first branch line plus the flow rate/volume passing through flow meter 2013, and issue a warning signal where the flow volumes vary by greater than a predefined allowable percentage variation. In various embodiments the predefined allowable percentage variation can be at least 0.1, 0.5, 1, 2, 3, 4, 5, 6, 7, 8, 9, and/or 10 percent. In various embodiments the predefined allowable percentage variation can fall within a range of between any two of the above referenced predefined allowable percentage variations.

In various embodiments the cumulative flow volumes/rates obtained from the plurality of flow meter units (e.g., flow meter units 100, 100', 100", 100''', and 100'''') can be used by method and apparatus 10, over the predefined measuring period for comparison with the flow rates/flow volumes reported as passing through flow meter 2011. Where the cumulative flow volumes through the flow meter units vary by greater than a predefined allowable percentage variation method and apparatus 10 can issue a warning. In various embodiments the predefined allowable percentage variation can be at least 0.1, 0.5, 1, 2, 3, 4, 5, 6, 7, 8, 9, and/or 10 percent. In various embodiments the predefined allowable percentage variation can fall within a range of between any two of the above referenced predefined allowable percentage variations.

Method and Apparatus Providing Different and/or Scaled Levels of Warning,

In various embodiments the method and apparatus 10 can rank the level of a leak incident for a particular reporting flow meter 100 unit based on the number of predefined time periods over which a predefined flow volume is exceeded for the predefined reporting period for a particular flow meter unit.

In various embodiments the ranking/warning level can be based on the volume quantity and/or flow indicia quantity for a flow meter unit 100 issues a warning signal. In various embodiments at least 2, 3, 4, 5, 6, 7, 8, 9, and/or 10 predefined volume and/or flow indicia quantities can be used by the method and apparatus 10 for determining different levels of warnings. In various embodiments the number of predefined volume and/or flow indicia quantities used for determining different warning levels can be within a range of between any two of the above number of predefined volume and/or flow indicia quantities.

In various embodiments the ranking/warning level can be based on the number of local leak detection sensors issuing warning signals to their respective operatively connected flow meter unit either simultaneously or within a predefined reporting period of time. In various embodiments at least 2, 3, 4, 5, 6, 7, 8, 9, and/or 10 local leak detection sensors giving warnings can be used by the method and apparatus 10 for determining different levels of warnings. In various embodiments the number of signaling local leak detection sensors used for determining different warning levels can be within a range of between any two of the above number of signaling local leak detection sensors used.

In various embodiments the ranking/warning level can be based on the number of flow meter units 100, 100', etc issuing warning signals either simultaneously or within a predefined reporting period of time. In various embodiments at least 2, 3, 4, 5, 6, 7, 8, 9, and/or 10 flow meter units 100, 100', etc. giving warnings can be used by the method and apparatus 10 for determining different levels of warnings. In various embodiments the number of signaling flow meter units 100,100', etc. used by method and apparatus for determining different warning levels can be within a range of between any two of the above number of signaling flow meter units used.

In various embodiments the predefined reporting period of time period can be at least 1, 2, 3, 4, 5, 6, 7, 8, 9, 10, 11, 12, 13, 14, 15, 16, 17, 18, 19, 20, 21, 22, 23, 24, 25, 30, 40, 50, and 60 minutes, 1, 2, 3, 4, 5, 6, 7, 8, 9, 10, 12, 14, 16, 18, 20, 22, and 24 hours, 1, 2, 3, 4, 5, 6, and 7 days. In various embodiments the predefined reporting period of time can be within a range of between any two of the above specified time periods (e.g., between 2 and 30 minutes, between 30 minutes and 2 hours, between 3 and 5 hours, etc.).

In various embodiments 2, 3, 4, 5, 6, 7, 8, 9, and/or 10 ranking levels can be provided. In various embodiments the number of ranking levels can be between any two of the above listed ranking levels.

In various embodiments the method and apparatus 10 can, for a predefined calendar reporting period, identify the number of reporting time periods over which a predefined flow volume is exceeded as signaled by a particular flow meter unit. In various embodiments the method and apparatus can rank the level of a leak incident for a particular reporting flow meter unit based on the number of predefined reporting time periods over which a predefined flow volume is exceeded for the predefined reporting period as signaled by a particular flow meter unit. In various embodiments 2, 3, 4, 5, 6, 7, 8, 9, and/or 10 ranking levels can be provided. In various embodiments the number of ranking levels can be between any two of the above listed ranking levels.

Method and Apparatus can be Operatively Connected to Non-Water Consuming Devices In various embodiments the method and apparatus 10 can be scalable with one or more sensors can be added to the building HVAC systems to monitor temperatures and cooling tower loops, as well building mechanical equipment and pumps. Automated alerts can be sent when parameters or anomalies are detected.

In-unit controllers 10 can also incorporate additional condominium or building monitoring and control for the owners such as remote thermostat control and security functions. Antenna 220 can transmit data via internet to a portal that sends automatic messages to an owner or a building manager or maintenance person. Owners can use an "app" on their smart phone to stay connected to their condominium unit and receive alerts regarding various sensed parameters (leakage, pressure excess, temperature excess).

The following is a table of reference numerals and descriptions of the reference numerals as used in this specification:

| Reference No. | Description |
| --- | --- |
| 10 | flow monitoring and leak detection system |
| 50 | central controller/computer |
| 60 | plurality of communications connections |
| 62 | first connection |
| 64 | second connection |
| 66 | third connection |
| 100 | metering unit |
| 105 | arrow schematically indicating connection (e.g., wireless) to one or more dedicated leak detection units |
| 110 | housing |
| 120 | back cover |
| 130 | front cover |
| 140 | interior |
| 150 | display/light panel |
| 151 | away indicator |
| 152 | offline indicator |
| 153 | flow indicator |
| 154 | warning/alert indicator |
| 155 | shutoff mode indicator |
| 160 | input/button panel |
| 161 | home/away mode toggle button |
| 162 | sensor bypass setting button |
| 163 | silence alarm setting button |
| 164 | manual valve open/close toggle button |
| 190 | inlet |
| 192 | outlet |
| 200 | controller |
| 210 | circuit board/controller board |
| 220 | antenna |
| 222 | dipole antenna |
| 250 | hard wire connection |
| 300 | flow meter housing/enclosure |
| 310 | inlet |
| 320 | outlet |
| 325 | gap |
| 327 | depth |
| 328 | width |
| 350 | interior |
| 360 | cover |
| 370 | gasket |
| 380 | plurality of fasteners |
| 390 | water inlet |
| 392 | water outlet |
| 500 | flow meter |
| 504 | casing |
| 508 | interior |
| 510 | inlet |
| 520 | outlet |

-continued

| Reference No. | Description |
| --- | --- |
| 600 | nutating disk |
| 700 | shaft |
| 710 | first end |
| 720 | second end |
| 900 | plurality of rotating magnets |
| 910 | first end |
| 920 | second end |
| 1000 | first magnet |
| 1010 | first pole of first magnet |
| 1020 | second pole of first magnet |
| 1050 | second magnet |
| 1060 | first pole of second magnet |
| 1070 | second pole of second magnet |
| 1100 | magnetic sensors |
| 1105 | offset between first and second sensors |
| 1120 | first sensor |
| 1150 | second sensor |
| 1152 | maximum amplitude |
| 1154 | offset zero amplitude |
| 1155 | offset or bias for zero amplitude |
| 1156 | minimum amplitude |
| 1156 | minimum amplitude |
| 1160 | first curve |
| 1162 | maximum point |
| 1164 | zero point |
| 1166 | minimum point |
| 1170 | second curve |
| 1180 | analogue to digital circuit |
| 1186 | square wave |
| 1187 | period for square wave |
| 1188 | measured flow point |
| 1190 | error correction curve/lookup table |
| 1192 | point on curve |
| 1193 | correction factor from curve |
| 1194 | point on curve |
| 1195 | correction factor from curve |
| 1200 | control valve |
| 1210 | inlet |
| 1220 | outlet |
| 1230 | valve motor drive |
| 1240 | control connection |
| 2000 | housing complex |
| 2005 | booster pum |
| 2010 | main water line |
| 2011 | flow meter for main water line |
| 2012 | first level branch line |
| 2013 | flow meter for first level branch line |
| 2016 | second level branch line |
| 2017 | flow meter for second level branch line |
| 2050 | first level |
| 2060 | second level |
| 2100 | first unit |
| 2102 | occupying sensor |
| 2110 | branch line for first unit |
| 2111 | arrow |
| 2112 | arrow |
| 2114 | main inlet line for first unit |
| 2120 | first branch from main inlet |
| 2122 | hose |
| 2130 | second branch from main inlet |
| 2132 | washing machine |
| 2140 | third branch from main inlet |
| 2142 | refrigerator with ice maker |
| 2150 | fourth branch from main inlet |
| 2151 | first sub-branch from fourth branch |
| 2152 | sink |
| 2153 | second sub-branch from fourth branch |
| 2154 | dishwasher |
| 2160 | fifth branch from main inlet |
| 2161 | first sub-branch from fifth branch |
| 2162 | toilet |
| 2163 | second sub-branch from fifth branch |
| 2164 | sink/vanity |
| 2165 | third sub-branch from fifth branch |
| 2166 | shower |
| 2170 | sixth branch from main inlet |
| 2171 | first sub-branch from sixth branch |

-continued

| Reference No. | Description |
| --- | --- |
| 2172 | sink/vanity |
| 2173 | second sub-branch from sixth branch |
| 2174 | bathtub |
| 2175 | third sub-branch from sixth branch |
| 2176 | toilet |
| 2178 | water heater |
| 2180 | seventh branch line |
| 2200 | second unit |
| 2210 | branch line for second unit |
| 2211 | arrow |
| 2212 | arrow |
| 2300 | third unit |
| 2311 | arrow |
| 2312 | arrow |
| 2310 | branch line for third unit |
| 2400 | fourth unit |
| 2410 | branch line for fourth unit |
| 2500 | fifth unit |
| 2510 | branch line for fifth unit |
| 3122 | leak detector for hose |
| 3132 | leak detector for washing machine |
| 3142 | leak detector for refrigerator with ice maker |
| 3152 | leak detector for sink |
| 3154 | leak detector for dishwasher |
| 3162 | leak detector for toilet |
| 3164 | leak detector for sink/vanity |
| 3166 | leak detector for shower |
| 3172 | leak detector for sink/vanity |
| 3174 | leak detector for bathtub |
| 3176 | leak detector for toilet |
| 3178 | leak detector for water heater |

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A flow meter apparatus, comprising:
   (a) a housing;
   (b) a flow meter contained in the housing, which flow meter (i) has a fluid pathway that is fluidly connectable to a water consuming unit and (ii) measures an amount of fluid passing through the fluid pathway;
   (c) wherein the fluid pathway travels through an inlet section, an outlet section and a bend section that connects said inlet and outlet sections;
   (d) a sensor operatively connected to the flow meter and which creates a flow signal representative of the amount of movement of the flow meter caused by the fluid passing through the fluid pathway;
   (e) wherein said sensor is positioned in between said inlet and outlet sections and spaced away from said bend section;
   (f) a controllable valve fluidly connected to the fluid pathway and having open and closed states;
   (g) a local controller operatively connected to the flow meter and operatively connected to the controllable valve;
   (h) the local controller being operatively connectable to a central control unit which central control unit receives the flow signal; and
   (i) the central control unit using the received flow signal, creating a response control signal which can be received by the local controller, and the local controller using the response control signal to either (i) issue a warning signal or (ii) change state of the controllable valve.

2. The flow meter apparatus of claim 1 wherein said inlet section and said outlet section have central longitudinal axes that are generally parallel.

3. The flow meter apparatus of claim 1 wherein fluid flow in said inlet section travels in a first direction and fluid flow in said outlet section flows in a second direction that is different from said first direction.

4. The flow meter apparatus of claim 1 wherein the inlet section is a tubular section.

5. The flow meter apparatus of claim 1 wherein the outlet section is a tubular section.

6. The flow meter apparatus of claim 1 wherein said bend section is a bend of about 180 degrees.

7. The flow meter apparatus of claim 1 wherein the sensor creates a flow signal representative to the amount of movement of the flow meter caused by fluid passing through the inlet section.

8. The flow meter apparatus of claim 1 wherein the sensor creates a flow signal representative to the amount of movement of the flow meter caused by fluid passing through the outlet section.

9. The flow meter apparatus of claim 1 wherein the sensor creates a flow signal representative to the amount of movement of the flow meter caused by fluid passing through the bend section.

10. The flow meter apparatus of claim 1 wherein said housing includes said inlet section, said outlet section and said bend section.

* * * * *